(12) United States Patent
Kelch

(10) Patent No.: US 9,176,329 B2
(45) Date of Patent: Nov. 3, 2015

(54) METHOD FOR DESIGNING A SPECTACLE LENS AND SPECTACLE LENS

(71) Applicant: Carl Zeiss Vision International GmbH, Aalen (DE)

(72) Inventor: Gerhard Kelch, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 88 days.

(21) Appl. No.: 13/852,955

(22) Filed: Mar. 28, 2013

(65) Prior Publication Data

US 2013/0258273 A1    Oct. 3, 2013

Related U.S. Application Data

(60) Provisional application No. 61/617,316, filed on Mar. 29, 2012.

(30) Foreign Application Priority Data

Mar. 29, 2012  (DE) .......................... 10 2012 102 743

(51) Int. Cl.
G02C 7/02    (2006.01)

(52) U.S. Cl.
CPC ... G02C 7/022 (2013.01); G02C 7/02 (2013.01); G02C 7/024 (2013.01); G02C 2202/22 (2013.01)

(58) Field of Classification Search
CPC .......... G02C 7/022; G02C 7/024; G02C 7/068
USPC ............... 351/159.45, 159.48, 159.58, 159.7, 351/159.75
See application file for complete search history.

(56) References Cited

U.S. PATENT DOCUMENTS 1,273,573 A    7/1918    Brilhart
1,554,933 A    9/1925    Wells
(Continued)

FOREIGN PATENT DOCUMENTS

CN         1274860 A      11/2000
CN       101646968 A       2/2010
(Continued)

OTHER PUBLICATIONS

Charman, W.N., "Hybrid diffractive-refractive achromatic spectacle lenses", Ophthal. Physiol. Opt., 1994, vol. 14, pp. 389 to 392, October, Butterworth-Heinemann for British College of Optometrists.
(Continued)

Primary Examiner — Jordan Schwartz
(74) Attorney, Agent, or Firm — Walter Ottesen P.A.

(57) ABSTRACT

The present invention relates to a spectacle lens comprising a first lens element and a second lens element, the first lens element having a front surface and a back surface that comprises a first back surface region and a second back surface region, the at least one second lens element comprising a front surface and a back surface, the second back surface region of the first lens element and the front surface of the second lens element being contiguous, a front surface of the spectacle lens being formed by the front surface of the first lens element and a back surface of the spectacle lens being formed in a base region by the first back surface region of the first lens element and in an achromatic region by the back surface of the at least one second lens element, the first back surface region of the first lens element having a first tangent at at least one first transition point between the base region and the achromatic region in a first cross-sectional plane of the spectacle lens, the back surface of the at least one second element having a second tangent at the at least one first transition point in the cross-sectional plane, wherein the first tangent and the second tangent intersect one another in the first cross-sectional plane. The present invention furthermore relates to a method for designing such a spectacle lens.

27 Claims, 25 Drawing Sheets

(56) References Cited

U.S. PATENT DOCUMENTS

| | | | |
|---|---|---|---|
| 1,729,066 A * | 9/1929 | Courmettes | 351/159.48 |
| 1,925,575 A | 9/1933 | Styll | |
| 3,771,858 A | 11/1973 | Bivens | |
| 3,973,838 A * | 8/1976 | Page | 351/159.7 |
| 8,777,409 B2 * | 7/2014 | Keane et al. | 351/159.73 |
| 2008/0088793 A1 | 4/2008 | Sverdrup et al. | |
| 2008/0304010 A1 | 12/2008 | Keane et al. | |
| 2010/0149485 A1 | 6/2010 | Torrey | |
| 2013/0271724 A1 | 10/2013 | Kelch | |

FOREIGN PATENT DOCUMENTS

| | | |
|---|---|---|
| GB | 219292 A | 1/1925 |
| GB | 487546 A | 6/1938 |
| WO | WO2008/039802 A2 | 4/2008 |
| WO | WO2012042030 A1 | 4/2012 |

OTHER PUBLICATIONS

Diepes, H. et al, "Optics and Technology of Spectacles", 2nd Edition, Optische Fachveroeffentlichung GmbH, Heidelberg, Germany, 2005, Chapter 5.3, 3 pages (English translation).

Shannon, R., "The Art and Science of Optical Design", Cambridge University Press, 1997, pp. 58 to 77.

English translation and Office action of the German Patent Office dated May 9, 2012 in German patent application 10 2012 102 743.9 on which the claim of priority is based.

English translation and Office action of the German Patent Office dated Jul. 20, 2012 in German patent application 10 2012 102 743.9 on which the claim of priority is based.

English translation and search report of the European Patent Office dated Jul. 17, 2013 in parallel European patent application 13160400.1-1562.

English translation and Office action of the German Patent Office dated Apr. 11, 2011 in German patent application 10 2010 047 846.6 (related patent family).

Written Opinion, International Search Report and International Preliminary Report on Patentability dated Dec. 2, 2011 in international patent application PCT/EP2011/067141 (related patent family).

English translation of the Office action of the German Patent Office dated Jan. 11, 2013 in German patent application 10 2012 102 743.9 on which the claim of priority is based.

English translation of the Office action of the German Patent Office dated Apr. 2, 2014 in German patent application 10 2012 102 743.9 on which the claim of priority is based.

DIN EN ISO 13666: 1998-11 of the DIN Deutschen Institut fuer Normung, e.V., pp. 1 to 51.

English translation and Office action of the Chinese Patent Office dated Jul. 1, 2014 in corresponding Chinese patent application 201310192256.2.

* cited by examiner

METHOD FOR DESIGNING A SPECTACLE LENS AND SPECTACLE LENS

CROSS-REFERENCE TO RELATED APPLICATIONS

This application claims the priority of German patent application DE 10 2012 102 743.9, filed on Mar. 29, 2012, and of U.S. provisional application No. 61/617,316, filed on Mar. 29, 2012.

BACKGROUND OF THE INVENTION

The present invention relates, according to a first aspect, to a method for designing a spectacle lens for a user, the spectacle lens comprising a first lens element and at least one second lens element, the first lens element having a front surface and a back surface that comprises a first back surface region and a second back surface region, the at least one second lens element comprising a front surface and a back surface, the second back surface region of the first lens element and the front surface of the second lens element being contiguous, a front surface of the spectacle lens being formed by the front surface of the first lens element and a back surface of the spectacle lens being formed in a base region by the first back surface region of the first lens element and in an achromatic region by the back surface of the at least one second lens element.

The present invention furthermore relates, according to a second aspect, to a method for producing a spectacle lens, which comprises the method for designing a spectacle lens according to the first aspect.

According to a third aspect, the present invention relates to a computer program product having program code for carrying out the method for designing a spectacle lens according to the first aspect of the invention.

The present invention furthermore relates, according to a fourth aspect, to a spectacle lens comprising a first lens element and at least one second lens element, the first lens element being formed from a first material and the second lens element being formed from a second material, the first material and the second material interacting at least partially achromatically, the first lens element having a front surface and a back surface that comprises a first back surface region and a second back surface region, the at least one second lens element comprising a front surface and a back surface, the second back surface region of the first lens element and the front surface of the second lens element being contiguous, a front surface of the spectacle lens being formed by the front surface of the first lens element and a back surface of the spectacle lens being formed in a base region by the first back surface region of the first lens element and in an achromatic region by the back surface of the at least one second lens element, the first back surface region of the first lens element having a first tangent at at least one first transition point between the base region and the achromatic region in a first cross-sectional plane of the spectacle lens, the back surface of the at least one second element having a second tangent at the at least one first transition point in the first cross-sectional plane.

The present invention furthermore relates to spectacles comprising a frame and at least one spectacle lens according to the fourth aspect.

It is widely known that, owing to the wavelength dependency of the refractive index of the optical material from which it is manufactured, a spectacle lens causes chromatic aberrations when the spectacle lens is manufactured from only one lens element. The chromatic aberrations include axial chromatic aberration, which creates different foci for different wavelengths of light. This is also referred to as longitudinal chromatic aberration. Besides axial chromatic aberration, transverse chromatic aberration occurs as a further chromatic aberration, which is manifested by colour fringes or colour edges in the image plane, i.e. on the retina of the eye in the case of a spectacle lens, which the spectacle wearer perceives and finds perturbing beyond a certain strength. Transverse chromatic aberration is also referred to as difference in chromatic magnification or as lateral chromatic aberration.

An estimate of the width of the resulting colour fringes, or the transverse chromatic aberration, can be given according to standard technical literature, for instance Diepes/Blendowske, "Optik and Technik der Brille" [Optics and technology of spectacles], Optische Fachveröffentlichung GmbH, Heidelberg, Germany, 2005, Chapter 5.3, by the formula:

$$\Delta\delta_{chrom} = \frac{\delta_e}{v_e}$$

where $\Delta\delta_{chrom}$ is a width of the colour fringe in $$\frac{cm}{m},$$

which is proportional to a prismatic power $\delta_e$ at the position in question and to the inverse of the Abbe number of the material in question. The prismatic power and the Abbe number in this case relate to the same wavelength, in the formula above to the e-line, i.e. a wavelength of 546.074 nm.

In the case of spectacle lenses with a low strength, the transverse chromatic aberration is not noticeable as a perturbation for the spectacle wearer. However, the chromatic aberration, in particular the transverse chromatic aberration, increases in the case of spectacle lenses with an increasing prismatic power. Furthermore, even if the ground prescription does not comprise prismatic correction, spectacle lenses may nevertheless exhibit transverse chromatic aberration owing to prismatic side-effects according to Prentice's rule for large viewing angles, even though the visual defect to be corrected is based on short-sightedness or long-sightedness.

High-index materials are often used nowadays, in particular plastics or high-index glass types, in order to keep the spectacle lens thickness as thin as possible for cosmetic reasons. Yet precisely in the case of materials with a high refractive index, the transverse chromatic aberration also becomes much stronger because an increasing refractive index generally entails a lower Abbe number.

It is therefore desirable to at least attenuate the transverse chromatic aberration which is created by a spectacle lens.

In the field of objectives, for example for cameras, it is known to correct chromatic aberration by so-called achromats. An achromat in optics means a system of at least two lenses which consist of materials with a different Abbe number and/or different refractive index and therefore different dispersion behaviour. One of the two lenses is a converging lens, which is conventionally made of a material with a higher Abbe number, for example crown glass, and the other lens is a diverging lens made of a material with a lower Abbe number and therefore higher dispersion than the converging lens, this lens being made for example from flint glass.

The two lenses are shaped and connected together at mutually complementary surfaces in such a way that the chromatic aberration is virtually eliminated for two wavelengths. The two lenses then interact achromatically.

In the context of the present invention, "interact with one another at least partially achromatically" or "interact achromatically" is intended to mean that the transverse chromatic aberration or the chromatic aberration is/are not necessarily entirely eliminated, but is/are at least attenuated.

The conventional achromats described above are not suitable for use as spectacle lenses. This is because, since these achromats are composed of two complete lenses, they also have a corresponding thickness and concomitantly a weight which is too high.

A lens is shown in the document GB 487 546 A. A lens may consist of two lens elements which essentially have the same refractive index, one of which lens elements is made of flint glass with a refractive index of about 1.61 and an inverse relative dispersion of about 36. The other lens element is made of barium crown glass with a refractive index of about 1.61 and an inverse relative dispersion of about 50. The former lens element is a diverging lens element, and the latter lens element is a converging lens element. The two lens elements are connected together at mutually complementary surfaces.

The lens produced in this way has a back surface, i.e. a surface facing towards the wearer's eye, which is formed entirely by the diverging lens element, while the front surface of the lens, i.e. the side of the lens facing away from the wearer's eye, is formed partially by the surface of the converging lens and in its edge region by the surface of the diverging lens. This lens furthermore suffers from the disadvantage that it consists of two lens elements and is therefore relatively thick and of high weight.

The technical article: "Hybrid diffractive-refractive achromatic spectacle lenses", W. N. Charman, Ophthal. Physiol. Opt. 1994, Vol. 14, pages 389 to 392 also relates to the reduction of chromatic aberrations in spectacle lenses. It is emphasised therein that achromats which comprise a lens with a low refractive index and a high Abbe number and a lens with a high refractive index and a low Abbe number, of which the first lens is divergent and the other convergent, are not practicable as spectacle lenses since they conflict with the desire for small thickness and low weight of spectacle lenses. In order to overcome the difficulty of achromats, it is proposed therein to combine a refractive lens with a diffractive element, in which case the combination of the refractive lens and the diffractive element can have essentially the same thickness and the same weight as the refractive lens on its own.

However, a spectacle lens which is composed of a refractive lens and a diffractive element is very elaborate in terms of its production, since the diffractive element has to be produced with high precision in order to prevent other imaging defects from being induced by the diffractive element.

BRIEF SUMMARY OF THE INVENTION

It is therefore an object of the invention to provide an improved method for designing a spectacle lens, an improved method for producing a spectacle lens, an improved spectacle lens and improved spectacles, which, despite the at least partial achromatic effect thereof, has/have a thickness which is as small as possible and a weight that is as low as possible and allows/allow a user, or wearer of the spectacle lens, a visual perception which is as free as possible from perturbation and as comfortable as possible.

According to a first aspect of the invention, it is provided a method for designing a spectacle lens for a user, in particular through the use of a non-transitory computer-readable medium, the spectacle lens comprising a first lens element and at least one second lens element, the first lens element having a front surface and a back surface that comprises a first back surface region and a second back surface region, the at least one second lens element comprising a front surface and a back surface, the second back surface region of the first lens element and the front surface of the second lens element being contiguous, a front surface of the spectacle lens being formed by the front surface of the first lens element and a back surface of the spectacle lens being formed in a base region by the first back surface region of the first lens element and in an achromatic region by the back surface of the at least one second lens element, comprising the following steps:

first establishing a first material of the first lens element and of a second material of the at least one second lens element, ascertaining at least one first transition point between the base region and the achromatic region on the back surface of the spectacle lens, a first cross-sectional plane of the spectacle lens extending through the at least one first transition point, first determining of a wedge edge angle between the back surface of the at least one second lens element and the front surface of the at least one second lens element at the at least one first transition point in the first cross-sectional plane and determining a kink angle between a tangent of the first back surface region in the first cross-sectional plane at the at least one first transition point and a tangent of the back surface of the at least one second lens element in the first cross-sectional plane at the at least one first transition point, in such a way that a prismatic power of the spectacle lens in the base region at the at least one first transition point corresponds for the user to a prismatic power of the spectacle lens in the achromatic region at the at least one first transition point, second establishing a first radius of curvature of the back surface of the at least one second lens element in the first cross-sectional plane at the transition point, second determining a second radius of curvature of the front surface of the at least one second lens element of the at least one second back surface region of the first lens element in the first cross-sectional plane at the transition point, in such a way that a spherical power and an astigmatic power of the spectacle lens in the base region at the transition point correspond for a user of the spectacle lens to a spherical power and an astigmatic power of the spectacle lens in the achromatic region at the transition point.

Accordingly, a "spectacle lens" refers to an ophthalmic lens which is worn in front of the eye but not in contact with the eye. Accordingly, this is a spectacle lens having two fully processed optical surfaces. It may be a spectacle lens before or after the edging. In principle, the spectacle lenses are delivered as so-called uncut spectacle lenses, or spectacle lenses finished with raw edges, for example from a large-scale laboratory to dispensing opticians. The uncut spectacle lens generally has a circular or elliptical edge shape. The uncut spectacle lenses are only adapted to a particular frame and brought into the final size and shape by edging on the dispensing optician's premises.

The term "optical axis" is intended to mean a straight line which is perpendicular to the two optical surfaces of a spectacle lens and along which light passes through the spectacle lens undeviated.

A "meridian plane" is intended to mean any plane which contains the optical axis of a spectacle lens.

The term "Abbe number" is intended to mean the Abbe number as described by the expression $$V = \frac{n_e - 1}{n_{F'} - n_{C'}},$$

with $n_e$ as the refractive index of the green mercury e-line (wavelength: 546.07 nm), $n_{F'}$, the refractive index of the blue cadmium F'-line (wavelength: 479.99 nm) and $n_{C'}$, the refractive index of the red cadmium C'-line (wavelength: 643.85 nm).

In the context of the present invention, a "cross-sectional plane" is intended to mean a cross section through the spectacle lens, which is parallel to an intended main fixation direction of a user through the spectacle lens. If the spectacle lens has an optical axis, the cross-sectional plane may be a meridian plane. If a spectacle lens does not have an optical axis, the cross-sectional plane may contain the geometrical centre, i.e. the point of intersection of the horizontal and vertical centrelines of the box, relating to the shape of the uncut spectacle lens. A "geometrical centre axis" then extends through the geometrical centre parallel to an intended main fixation direction through the spectacle lens. The cross-sectional plane can therefore contain the visual point, i.e. the point of intersection of the line of sight with the back surface of the spectacle lens.

The "line of sight" is in this case intended to mean the line which joins the centre of the fovea to the centre of the exit pupil of the eye and its continuation from the centre of the entrance pupil forward into object space.

In the context of the present application, a "main visual point" is in this case intended to mean the point on the back surface of the spectacle lens at which the line of sight intersects the back surface of the spectacle lens, when the eye assumes a relaxed position. This is also referred to as "primary position", i.e. a position of the eye relative to the body for the case in which the eyes look straight in a fixation direction at an object which lies at eye level.

In the case of decentration of the spectacle lens, the required centration point is different from the geometrical boxed centre in the form of the edged spectacle lens. In particular, the cross-sectional plane may then comprise the "fitting point", i.e. the point on the front surface of the spectacle lens or of the uncut spectacle lens which, according to the stipulation of the manufacturer, is to be used as a reference point for positioning the lens in front of the eye. The position of the fitting point is generally placed and readable as a marking in the spectacle lens.

The terms "front surface" and "back surface" in the context of the present application refer to the surface of the first lens element on which the second lens element is applied. The second lens element is always applied on the back surface of the first lens element. A surface of the first lens element facing away from the second lens element is therefore always the front surface of the first lens element. That surface of the second lens element which adjoins the first lens element is always the front surface of the second lens element. The side of the second lens element facing away from the first lens element is always the back surface of the second lens element.

It follows from this that the terms "front surface" and "back surface" in the context of the present application may correspond to the common meaning in the art although they do not have to. According to the common meaning in the art, the term "front surface" is intended to mean the surface of the spectacle lens which is intended to face away from the eye in the spectacles. According to the common meaning in the art, the term "back surface" is intended to mean the surface of a spectacle lens which is intended to face towards the eye in the spectacles. The terms of the application thus correspond to the common meaning in the art when the second lens element is finally intended to be arranged on the eye side of the first lens element. If the second lens element is intended to be arranged on the side facing away from the eye, precisely the opposite meaning results. The "front surface" in the context of the application would then be the back surface in the sense of the common meaning in the art and the "back surface" in the context of the application would be the front surface in the sense of the common meaning in the art.

The term "prismatic power" is intended to mean both the prismatic deviation and the base setting of the prismatic deviation. "Prismatic deviation" is intended to mean the change in direction of a ray of light as a result of refraction. When a prismatic power is referred to in relation to a cross-sectional plane or in a cross-sectional plane, then this is intended to mean the prismatic power in the corresponding cross-sectional plane. The base position is defined according to the well known meaning in the art, and it may be indicated for example in polar coordinates according to the TABO scheme, the semicircular degrees of arc scheme widely known to the person skilled in the art.

The term "dioptric power" is intended to mean both the focal power and the prismatic power of a spectacle lens.

The term "focal power" describes both the spherical and astigmatic powers of a spectacle lens at a particular point.

"Contiguous" is intended to mean that two surfaces are connected together or arranged next to one another, while not forming an air gap between them. The two surfaces of the contiguous lens elements are therefore configured with complementary shapes to one another.

The term "at a transition point" is intended to mean an infinitesimally small approximation to the transition point.

The "transition point" is intended to mean the point at which a surface of the first lens element and a surface of the second lens element meet one another and therefore transition into one another.

A "perturbing transverse chromatic aberration" is intended to mean a limit value which can be defined as one beyond which a transverse chromatic aberration is defined as perturbing and should therefore be eliminated. Examples of such a limit value may be 0.25 cm/m or for instance 0.5 cm/m. When a transverse chromatic aberration actually begins to be perceived as perturbing by a user differs individually. In general, a perturbing transverse chromatic aberration is defined as a transverse chromatic aberration of more than 0.25 cm/m.

The term "for a user" is intended to mean the effect of the spectacle lens for the user for whom the spectacle lens is designed. Such a calculation "for a user" is therefore carried out on the basis of user data. In particular, these user data relate to a position of the assumed eye rotation point relative to the spectacle lens. In particular, the position of the eye rotation point is indicated as a distance from the back surface of the spectacle lens. In the case of a rotationally symmetrical spectacle lens, for example, the eye rotation point lies at a certain distance from the back surface of the spectacle lens on its optical axis.

"User data" may be both individual user data and standard user data. For example, a monofocal spectacle lens with a particular dioptric power may be configured for standard user data. Individual user data are, for example, recorded by an optician and sent to a spectacle manufacturer in order to calculate a design of the spectacle lens.

The term "in such a way that for" relating to the determination of particular effects of the spectacle lens for a user is intended to mean the effects for a principal ray of the user extending through the eye rotation point. A change in the transverse chromatic aberration for the user is also based on a principal ray of the user extending through the eye rotation point.

A "normal plane" is intended here to mean a plane which is perpendicular to the cross-sectional plane. A normal plane is therefore, for example, in which the box frame of the spectacle lens is also specified. If the normal plane is an X-Y plane, for example, then a cross-sectional plane could lie in the Y-Z plane.

An "axial position range" or an "axial position" relating to the position of the cross-sectional plane is therefore intended to mean an angular position within the normal plane in a similar way to the TABO scheme. It is, in particular, explained in the description of the figures with reference to FIG. 8.

As already mentioned above, in the context of the present invention "interact with one another at least partially achromatically" or "interact achromatically" is intended to mean that the transverse chromatic aberration or the chromatic aberration is/are not necessarily entirely eliminated, but is/are at least attenuated. The first material of the first lens element and the second material of the second lens element therefore have different refractive indices and/or different Abbe number at the same wavelength, so that the first lens element and the second lens element then interact at least partially achromatically.

The back surface of the spectacle lens according to the invention has a "base region" and an "achromatic region". The "base region" is in this case defined as the region of the back surface of the spectacle lens which is formed by the first back surface region of the first lens element. The "achromatic region" is defined as the region of the back surface which is formed by the back surface of the second lens and in the achromatic region, the first lens element and the second lens element therefore interact at least partially achromatically.

A "basic design" of the first lens element is intended in the context of the present application to mean the data describing the first lens element, apart from the profile of the second back surface region. The basic design therefore comprises a material of the first lens element, the data of the profile or geometry of the front surface, the data of the profile or geometry of the first back surface region and the centre thickness of the first lens element. It furthermore comprises the inclination of the front surface and of the first back surface region relative to one another or, generally speaking, the position of the coordinate system describing the front surface and of the coordinate system describing the first back surface region relative to one another.

The "box" or the "boxing system" is a system of dimensions and definitions which is based on a rectangle that is formed by the horizontal and vertical tangents to the outermost edges of the spectacle lens or semifinished spectacle lens. The "horizontal centreline" is the line which is equidistant from the two horizontal tangents. The "vertical centreline" is the line which is equidistant from the two vertical tangents. The point of intersection of the vertical centreline and the horizontal centreline is also referred to as the "geometrical centre". In the case of a box for an edged spectacle lens in a frame, the point of intersection is also referred to as the "boxed centre". The "spectacle plane" of spectacles is the plane which contains the vertical centreline of the first, or left spectacle lens and the vertical centreline of the second, or right spectacle lens.

The concept that the spherical or astigmatic powers in the base region and the achromatic region "correspond to one another" is intended to mean that the powers lie within a tolerance range of 0.1 dpt relative to one another, and in particular they are identical. For example, a spherical power in the base region at the transition point may be +2.0 dpt. With a spherical power in the achromatic region at the transition point of more than +1.9 dpt and less than +2.1 dpt, powers would still "correspond to one another". In particular, the powers are identical, i.e. in the example mentioned above both powers would then be +2.0 dpt. The term "correspond to one another" is thus to be understood as a tolerance range of less than 0.1 dpt difference.

According to the invention, it is therefore proposed to configure a second lens element on the back surface of a first lens element and to form the spectacle lens from these two lens elements. The two lens elements in this case interact at least partially achromatically. This means that the first lens element and the at least one second lens element are formed from different materials with different Abbe numbers.

For a user of the spectacle lens, the effect of the spectacle lens may change abruptly when he moves his line of sight from the first lens element or the base region into the achromatic region with the at least one second lens element. In principle, however, such power discontinuities at a transition point or at a transition line composed of the transition points between the base region and the achromatic region may be perturbing for a user of the spectacle lens.

Although a transverse chromatic aberration can be reduced significantly by the at least one second lens element in the achromatic region, on the other hand these power discontinuities, possibly perceived as perturbing, nevertheless occur at the transition line between the base region and the achromatic region. By means of the proposed method according to the invention, however, it is possible to eliminate all power discontinuities between the base and achromatic regions for a user of the spectacle lens. The visual perception is thereby significantly improved.

This is made possible in particular by obviating the continuous differentiability of the back surface of the spectacle lens, which is required for the conventional design of spectacle lenses. According to the invention, a tangent of the first back surface region of the first lens element in the base region at the transition point in the first cross-sectional plane and a tangent of the back surface of the at least one second lens element in the achromatic region at the transition point in the cross-sectional plane can intersect one another. In other words, the back surface of the spectacle lens then has a kink at the transition point.

The angle between the tangents will also be referred to as the "kink angle". Surprisingly, precisely this kink on the back surface of the spectacle lens allows additional degrees of freedom in the configuration, making configuration possible in such a way that there are no power discontinuities in the prismatic power, the spherical power or the astigmatic power at the transition point for the user.

The proposed method therefore makes it possible to provide a spectacle lens which requires the provision of at least one second lens element only in regions in which it has been determined that the transverse chromatic aberration is perturbing. In the case of a rotationally symmetrical spectacle lens, for example, this may involve a peripheral region of the spectacle lens. The first and second lens elements therefore do not need to cover one another fully. The back surface is partially formed by the back surface of the first lens element, namely in regions in which the transverse chromatic aberration is not perturbing for the user. In the other regions, the at least one second lens element is applied on the back surface of the first lens element, and the transverse chromatic aberration is likewise reduced in these regions owing to the at least partial achromatic interaction of the first and second lens elements. At the same time, the weight of the overall spectacle lens is reduced in comparison with a "full achromat" in which two lens elements are connected to one another surface-wide, since the at least one second lens element is provided only where it is needed. Furthermore, by obviating the requirement for continuous differentiability of the back surface of the spectacle lens at the transition points, or on the transition line between the base region and the achromatic region, both a prismatic power discontinuity and a discontinuity in the spherical and astigmatic powers can be avoided. This allows perturbation-free and comfortable visual perception.

According to a second aspect of the invention, a method for producing a spectacle lens is furthermore provided, which comprises the steps of designing spectacle lens according to the first aspect of the invention or one of its refinements and furthermore the steps of manufacturing the first lens element, manufacturing the at least one second lens element and connecting the first lens element and the at least one second lens element.

In this way, it is possible to produce a spectacle lens which has the advantages described above.

According to a third aspect of the invention, a computer program product is furthermore provided, in particular stored on a non-transitory computer-readable medium, having program code which is configured in order to carry out a method according to the first aspect of the invention or one of its refinements when the computer program product is run on a data-processing device.

The computer program product therefore allows the above-described configuration of a spectacle lens, and therefore has the same advantages.

According to a fourth aspect of the invention, there is provided a spectacle lens comprising a first lens element and a second lens element, the first lens element being formed from a first material and the second lens element being formed from a second material, the first material and the second material interacting at least partially achromatically, the first lens element having a front surface and a back surface that comprises a first back surface region and a second back surface region, the at least one second lens element comprising a front surface and a back surface, the second back surface region of the first lens element and the front surface of the second lens element being contiguous, a front surface of the spectacle lens being formed by the front surface of the first lens element and a back surface of the spectacle lens being formed in a base region by the first back surface region of the first lens element and in an achromatic region by the back surface of the at least one second lens element, the first back surface region of the first lens element having a first tangent at at least one first transition point between the base region and the achromatic region in a first cross-sectional plane of the spectacle lens, the back surface of the at least one second element having a second tangent at the at least one first transition point in the first cross-sectional plane, wherein the first tangent and the second tangent intersect one another at a kink angle in the first cross-sectional plane, the magnitude of the kink angle being less than 90°.

By this design feature, as described above, it becomes possible for the spectacle lens to have no power discontinuities for a particular user at the transition point or on the transition line between the base region and the achromatic region. As mentioned above, the back surface of the spectacle lens is therefore not continuously differentiable. In other words, the back surface of the spectacle lens has a kink at the first transition point. Hence, the kink angle may be larger than 0°.

Such a spectacle lens then has the advantages described above, namely that despite a significantly reduced transverse chromatic aberration it can be produced with relatively low weight and furthermore imparts a comfortable visual impression to the user since power discontinuities do not occur between the base region and the achromatic region.

According to a fifth aspect of the invention, spectacles having a frame and a first and a second spectacle lens are provided, the first and/or the second spectacle lens being a spectacle lens according to the fourth aspect or one of its refinements, the cross-sectional plane or each cross-sectional plane of the respective spectacle lens containing a boxed centre of the respective spectacle lens and extending as a normal to a plane of the spectacle plane of the spectacles, the plane of the spectacle plane containing the vertical centre-lines of the box of the first and second spectacle lenses.

In one refinement of the method according to the first aspect of the invention, the first material of the first lens element and the second material of the at least one second lens element may be established in such a way that the first lens element and the at least one second lens element interact at least partially achromatically.

Therefore, even in the event that more than one second lens element is provided, the at least one second lens element may respectively be formed from a second material. It then interacts at least partially achromatically with the first lens element. The effect of this is that the first material and the second material have different Abbe numbers. As an alternative, in the event that more than one second lens element is provided, the different second lens elements may of course respectively consist of different materials. In this case as well, however, each second lens element consists of a material that has an Abbe number which is different from that of the first material of the first lens element.

In another refinement of the method according to the first aspect of the invention, the first establishment step may comprise establishment of a basic design of the first lens element, the basic design comprising at least the front surface of the first lens element and the first back surface region of the first lens element.

In this way, the appearance of the spectacle lens in the base region, or the first lens element, may be established first. For the basic design, the transverse chromatic aberration and therefore the position of the transition points, or of the base region and of the achromatic region, may then be ascertained for the user. For example, the basic design may be a design configured and optimized in such a way that it implements a prescribed correction for the user.

In another refinement of the method according to the first aspect of the invention, the front surface of the first lens element may be spherical and the first establishment step may comprise establishment of a first radius of the front surface of the first lens element.

This refinement allows a geometrically straightforward configuration of the front surface of the spectacle lens and of the first lens element. Furthermore, such a spherical front surface can be manufactured with simple manufacturing means. Naturally, such a spherical front surface of the spectacle lens is per se restricted in the nature of the effects and the distribution thereof over the front surface. This, however, may be supplemented by a corresponding configuration of the back surface of the spectacle lens.

According to another refinement of the method according to the first aspect, the first back surface region of the first lens element is spherical in the base region, and the first establishment step comprises establishment of a second radius of the first back surface region.

Depending on the correction to be carried out by the spectacle lens for the user, a first back surface region configured in such a way may already be sufficient. A first back surface region configured in such a way may then in turn be manufactured with simple means. In particular when both the front surface of the first lens element and the first back surface region of the first lens element are spherical, the first lens element then has an optical axis which extends through the rotational symmetry point of the front surfaces and the rotational symmetry point of the first back surface region.

In another refinement of the method according to the first aspect, in the step of the first determination of the kink angle, the kink angle may be determined as a function of the first material, the at least one second material, a predetermined variation of the transverse chromatic aberration for the user of the spectacle lens at the transition point, the prismatic power of the first lens element in the first cross-sectional plane in the base region at the transition point, an inclination angle of the front surface of the first lens element relative to a normal plane of the first cross-sectional plane at a pass point through the front surface of the first lens element of a principal ray coming from an eye rotation point of the user through the at least one first transition point, and an inclination angle of the first back surface region relative to the normal plane at the at least one first transition point.

Such determination of the kink angle can be carried out in a straightforward way and represents the physical situation accurately enough in order to provide a satisfactory result of the configurations. A calculation for a principal ray of the eye of the user, i.e. a ray which does not experience any optical deviation by the user's eye and extends through an eye rotation point of the user, which is stored in the respective user data, allows a configuration of the spectacle lens which corresponds to the necessary accuracy requirements. The configuration of the spectacle lens is then carried out with the aid of a multiplicity of principal rays, which are calculated for different fixation directions of the eye. The proposed determination of the kink angle makes it possible for the tangents of the base region and of the achromatic region to intersect at the transition point in the cross-sectional plane. The requirement for continuous differentiability of the back surface of the spectacle lens is obviated. In this way, in the first determination step, it is possible to configure the prismatic power of the achromatic region in the cross-sectional plane in such a way that it corresponds at the transition point to the prismatic power of the base region in the cross-sectional plane. A continuous profile of the prismatic power is therefore obtained without discontinuity points over the height of the spectacle lens. If the user turns his eye or a fixation direction within the cross-sectional plane over the height of the spectacle lens, for example when he fixates on an object in a peripheral field of view, no prismatic power discontinuity, which would be irritating for a user or impair his visual impression, occurs at the transition from the base region to the achromatic region.

In another refinement of the method according to the first aspect, the kink angle may be determined at least approximately by means of the equation $$KW = Kh - Kv + w1 - w2,$$

where $KW$ is the kink angle in degrees, $Kh$ is the wedge edge angle in degrees, $Kv$ is a further wedge angle between the front surface of the first lens element and the front surface of the at least one second lens element in degrees for a principal ray coming from the eye rotation point of the user, $w1$ is the inclination angle of the front surface of the first lens element relative to a normal plane of the first cross-sectional plane at a pass point through the front surface of the first lens element of a principal ray coming from the eye rotation point of the user through the at least one first transition point, and $w2$ is the inclination angle of the first back surface region relative to the normal plane at the at least one first transition point.

In the equation given above, the angles $Kh$ and $Kv$ are without reference to their sign, i.e. only the magnitude of the respective angle in degrees is used. The angles $w1$ and $w2$ do have a sign. These $w1$ and $w2$ are positive when they point from the X-Y plane, or the normal plane, in the direction of the positive Z axis, or at the user's eye. For the kink angle $KW$, the corresponding angle in the cross-sectional plane is then given. A positive kink angle $KW$ therefore means that the back surface of the spectacle lens has a kink in the direction of the user at the transition point. Correspondingly, for a negative kink angle $KW$, the difference that the back surface of the spectacle lens kinks away from the user at the transition point. In other words, in a function $z(y)$ in the cross-sectional plane of the back surface of the spectacle lens, the gradient of the achromatic region at the transition point is greater than the gradient of the base region at the transition point when the kink angle $KW$ is positive. If the gradient across the transition point becomes smaller, the kink angle $KW$ is negative.

In this way, when designing a spectacle lens, the kink angle can already be determined straightforwardly to a relatively good approximation. By means of this kink angle ascertained by the approximation described above, a spectacle lens can already be manufactured. Furthermore, it is of course possible for the approximate solution found in this way to be used as a start value for an optimization based on the approximate solution. An optimization started by means of an approximate solution as described above leads to a result more rapidly than an optimization based on different or arbitrary start values.

An approximation as described above can therefore save on the resources necessary in the electronic data processing and save on the computation time for finding the optimized solution.

In another refinement of the invention according to a first aspect, in the step of first determination of the wedge edge angle, the wedge edge angle may be determined as a function of the first material, the at least one second material and the predetermined change in the transverse chromatic aberration of the spectacle lens at the transition point.

This makes it possible not only to avoid a discontinuity in the prismatic power occurring at a transition point in the cross-sectional plane, but also to achieve a predetermined change in the transverse chromatic aberration on or at the transition point owing to the degrees of freedom both of the kink angle and of the wedge edge angle. In this way, it is possible to establish the reduction which the transverse chromatic aberration experiences at the transition point. At the same time, these degrees of freedom make it possible to establish the reduction of the transverse chromatic aberration at the transition point as a function of the position of the transition point relative to an edge of the spectacle lens and the transverse chromatic aberration limit value established as perturbing, merely at a size which is just necessary so that a transverse chromatic aberration of the spectacle lens is not perceived as perturbing in a field of view which is as large as possible. In this way, the size or thickness, i.e. the extent in the Z direction, of the at least one second lens element can be kept as small as is necessary. The wedge edge angle and the kink angle therefore provide two degrees of freedom for the configuration of the spectacle lens, which make it possible to implement a predetermined change in the transverse chromatic aberration at the transition point and furthermore to avoid a prismatic power discontinuity at the transition point.

In another refinement of the method according to the first aspect, the wedge edge angle may be determined at least approximately by means of the equation $$Kh = 2 \cdot \arccos\left(\frac{nr - \cos\left(\frac{ah}{2}\right)}{\sqrt{1 + nr^2 - 2 \cdot nr \cdot \cos\left(\frac{ah}{2}\right)}}\right),$$

where $Kh$ is the wedge edge angle in degrees, $nr$ is the refractive index of the at least one second material at a calculation wavelength and $ah$ is an angle of deviation in the cross-sectional plane, the angle of deviation being determined at least approximately by means of the equations $$ah = \arctan\left(\frac{Ph}{100}\right) \text{ und } Ph = \frac{\Delta \cdot nyg \cdot nyr}{nyg - nyr},$$

where $\Delta$ is a predetermined change in the transverse chromatic aberration of the spectacle lens at the transition point, $nyg$ is an Abbe number of the first lens element at the calculation wavelength, and $nyr$ is an Abbe number of the at least one second lens element at the calculation wavelength.

Again, the procedure proposed above allows at least approximate determination of the wedge edge angle. In this way, it is likewise possible to find a solution for the wedge edge angle which can already be used for manufacturing the spectacle lens. Furthermore, this solution may be used as a start value of a subsequent optimization of the spectacle lens. Such an optimization can be completed more rapidly, which can save on computation time and data-processing resources.

In another refinement of the invention according to the first aspect, the further wedge angle may be determined at least approximately by means of the equation $$Kv = 2 \cdot \arccos\left(\frac{ng - \cos\left(\frac{av}{2}\right)}{\sqrt{1 + ng^2 - 2 \cdot ng \cdot \cos\left(\frac{av}{2}\right)}}\right),$$

where $Kv$ is the further wedge angle in degrees, $ng$ is the refractive index of the first material at a calculation wavelength and $av$ is a further angle of deviation in the first cross-sectional plane, the angle of deviation being determined at least approximately by means of the equations $$av = \arctan\left(\frac{Pv}{100}\right) \text{ und } Pv = -\frac{\Delta \cdot nyg \cdot nyr}{nyg - nyr} + Pg,$$

where $\Delta$ is a predetermined change in the transverse chromatic aberration of the spectacle lens at the transition point, $nyg$ is an Abbe number of the first lens element at a calculation wavelength, $nyr$ is an Abbe number of the at least one second lens element at the calculation wavelength, and $Pg$ is the prismatic power of the first lens element in the first cross-sectional plane in the base region at the transition point.

In this way, it is likewise possible to determine the further wedge angle $Kv$ at least approximately during the first determination step. This makes it possible to approximate the start conditions for a possible subsequent further optimization of the spectacle lens closer to the final solution and spare computation times and resources for the calculation. Furthermore, it is of course possible for the solution found by means of the formulae described above to be used directly for manufacturing the spectacle lens.

In one refinement of the method according to the first aspect, in the step of the at least one second determination of the second radius of curvature, the second radius of curvature may furthermore be determined at least approximately by means of the equation $$r3 = \frac{(ng - nr) \cdot r2 \cdot r4}{(1 - nr) \cdot r2 + (ng - 1) \cdot r4},$$

where $r3$ is the second radius of curvature in mm, $r2$ is the fourth radius of curvature in mm, and $r4$ is the first radius of curvature in mm, $ng$ is a refractive index of the first material at a calculation wavelength, and $nr$ is a refractive index of the at least one second material at the calculation wavelength.

After the first determination step, the method for designing the spectacle lens still has two degrees of freedom available at the transition point, i.e. the second radius of curvature and the first radius of curvature. In other words, in this way a second derivative of the front surface and of the back surface of the second lens element is specified to an infinitesimally small approximation at the transition point. Since the back surface of the spectacle lens is formed by the back surface of the second lens element in the achromatic region, it is established in the configuration. Depending on the further profile of the back surface of the second lens element, the establishment of the first radius of curvature at the transition point may optionally already accurately define the further profile of the back surface of the second lens element up to the edge. This will be further explained below. Therefore, by means of establishing the first radius of curvature, for example in the case of a spherical back surface of the second lens element, the back surface of the spectacle lens and therefore a thickness of the spectacle lens, in particular at an edge of the spectacle lens, may already be established. With the second radius of curvature of the front surface of the second lens element, or of the second back surface region of the first lens element, a further degree of freedom is therefore also available which may be selected in such a way that the spherical power and the astigmatic power of the achromatic region at the transition point correspond to those of the base region at the transition point. In this way, a profile of the achromatic effect and of the spherical power of the spectacle lens is continuous across the transition point. When the eye is turned, or in the event of a fixation direction of the eye above the transition point, no discontinuity in the spherical or astigmatic power occurs. Furthermore, by means of establishing the first radius of curvature and determining the second radius of curvature, a profile of the transverse chromatic aberration in the achromatic region can be adjusted, when the second back surface region and/or the back surface of the second lens element are formed by circular partial cross-sections, a toric surface or a second-order polynomial.

The steps of establishing the first radius of curvature and of the subsequent second determination of the second radius of curvature, when the second back surface region and/or the back surface of the second lens element are formed by circular partial cross-sections, a toric surface or a second-order polynomial, therefore make it possible on the one hand to establish the profile of the back surface of the spectacle lens and the profile of the transverse chromatic aberration over the achromatic region and then, on the basis of this, to adjust a spherical and an astigmatic power of the achromatic region in such a way that no discontinuity in the spherical and astigmatic powers occurs at the transition point.

In another refinement of the method according to the first aspect, at least the steps of the first determination of the wedge edge angle and the kink angle and of the at least one second determination of the second radius of curvature may be carried out in a multiplicity of different cross-sectional planes, and for at least one transition point in each cross-sectional plane of the multiplicity of cross-sectional planes.

It is therefore readily possible to place not only one cross-sectional plane but a multiplicity of different cross-sectional planes through the spectacle lens, and to carry out the configuration steps of the method in each cross-sectional plane. For example, 360 cross-sectional planes inclined by 1 degree to one another may be placed around the spectacle lens and an optimization may be carried out in each of the planes. In this way, optimization of the configuration can be carried out over the entire circumference of the spectacle lens.

In another refinement of the method according to the first aspect, the spectacle lens is rotationally symmetrical with respect to an optical axis of the spectacle lens, and the steps of the first determination of the wedge edge angle and the kink angle and of the determination of the second radius of curvature are carried out in only one cross-sectional plane.

In the case that the spectacle lens is formed rotationally symmetrically with respect to an optical axis of the spectacle lens, it is to be understood that optimization of the spectacle lens in only one cross-sectional plane is sufficient in order to establish the overall design of the spectacle lens, or of the first lens element and of the at least one second lens element. In this way, particularly straightforward configuration of the spectacle lens is provided.

In particular, a refinement of the invention according to the first aspect may be provided in that the first cross-sectional plane is a meridian plane of the spectacle lens. If the spectacle lens has an optical axis, the first cross-sectional plane or the cross-sectional planes respectively extend in such a way that they contain the optical axis. In the case of a rotationally symmetrical spectacle lens, the optical axis furthermore corresponds to the axis of the rotational symmetry.

In another refinement of the method according to the first aspect, the cross-sectional plane may comprise the respective at least one first transition point, an eye rotation point of the user and a zero visual point on the back surface of the spectacle lens.

In this way, the position of the cross-sectional plane is defined for the configuration method independently of a geometry of the spectacle lens. It furthermore ensures that the configuration and optimization of the spectacle lens are respectively carried out starting from the relaxed position of the eye and the corresponding zero visual line for deflections of the line of sight starting from this relaxed position.

In another refinement of the method according to the first aspect, the front surface of the first lens element and/or the first back surface region of the first lens element may be spherical.

Furthermore, in a refinement of the method according to the first aspect, the front surface of the at least one second lens element and/or the back surface of the at least one second lens element may have a constant curvature in the first cross-sectional plane. If the front surface of the at least one second lens element has a constant curvature, it follows that the second back surface region likewise has a constant curvature.

As already mentioned above, the spherical subsurfaces can be manufactured particularly straightforwardly. By the configuration of both the wedge angle and the kink angle as well as the second radius of curvature and the first radius of curvature of the achromatic region at the transition point, in the case of designing the front surface and/or the back surface of the at least one second lens element with a constant curvature in the cross-sectional plane, the respective surfaces are established in terms of their further profile. A surface or subsurface which has a constant curvature in the cross-sectional plane may also be formed for example from circular partial cross-sections in the cross-sectional plane. The corresponding surface may, for example, be a toric surface.

In another configuration of the method, a centre of curvature of the front surface of the at least one second lens element and/or of the back surface of the at least one second lens element in the first cross-sectional plane may in this case lie outside a symmetry axis of the front surface of the at least one second lens element or respectively the back surface of the at least one second lens element.

The centre of curvature of the front surface or the back surface of the at least one second lens element therefore does not necessarily rely on an optical axis or a zero visual line. In this way, the second lens element is optionally bounded by toric surfaces.

In another configuration of the method according to the first aspect, the front surface of the at least one second lens element and/or the back surface of the at least one second lens element may be aspherical. In this case, the front surface of the at least one second lens element and/or the back surface of the at least one second lens element may be rotationally symmetrical with respect to an optical axis of the spectacle lens. The front surface of the at least one second lens element and/or the back surface of the at least one second lens element may, however, also be rotationally non-symmetrical.

In particular, the front surface of the at least one second lens element and/or the back surface of the at least one second lens element may be describable by a second- or higher-order polynomial. In particular, for example, a third- or fourth-order polynomial may be provided. A third-order polynomial may, for example, be configured in the form $z(y)=Ay^3+By^2+Cy+D$, where A, B, C, and D are constants.

In the case of a second-order polynomial, owing to the constraints established for the transition point in terms of the wedge edge angle, the kink angle as well as the second radius of curvature and the first radius of curvature, there are no longer any degrees of freedom for the configuration of the corresponding second-order polynomial, so that the profile of the front surface or of the back surface of the second lens element, and therefore also the further profile of the back surface of the spectacle lens in the cross-sectional plane, is established. In the case of a third- or fourth-order polynomial, however, there is in turn a degree of freedom in one order, with which the profile of the back surface of the spectacle lens or of the back surface of the second lens element and optionally also of the front surface of the second lens element can be influenced. Again, both the profile of the transverse chromatic aberration over the height of the achromatic region and the profile of the spherical power, as well as of the astigmatic power, can be influenced by means of this additional degree of freedom. It is, however, also possible to carry out optimization of the spectacle lens to the extent that as small as possible an edge thickness of the spectacle lens is achieved.

In another refinement of the method according to the first aspect, the wedge edge angle, the kink angle and the second radius of curvature may be determined approximately in the determination steps, a step of optimizing the wedge edge angle, the kink angle and the second radius of curvature subsequently being carried out by using a ray tracing method. Furthermore, other parameters of the front surface and of the back surface of the spectacle lens may of course also be optimized by means of the ray tracing method. For example, when the back surface of the second lens element is formed from a third- or higher order polynomial, the coefficients of the polynomial may likewise be optimized by means of the ray tracing method.

Such ray tracing methods are known in principle to the person skilled in the art. They are described, for example, in "Robert R. Shannon, The Art and Science of Optical Design, Cambridge University Press, 1997".

In this way, it is possible to further optimize the spectacle lens design initially ascertained at least approximately by means of the configuration steps described above. In this case, the optimization step can in particular be carried out much more rapidly in particular on the basis of the solutions initially found at least approximately. Furthermore, it is possible to save on resources of a data-processing device used for this.

In one refinement of the method according to the first aspect, the ascertainment of the at least one transition point may be carried out on the basis of a predetermined transverse chromatic aberration limit value of a chromatic aberration for the user, the transverse chromatic aberration for the user at the at least one first transition point being less than or equal to the transverse chromatic aberration limit value. In particular, the transverse chromatic aberration at the at least one first transition point may be equal to the transverse chromatic aberration limit value.

For example, the transverse chromatic aberration limit value may be established at 0.25 cm/m. The transition point in the cross section is then to be positioned in such a way that the transverse chromatic aberration limit value for the user is not exceeded in it. In order to keep the volume of the at least one second lens element as small as possible, the transition point is generally placed precisely at a point in which the transverse chromatic aberration limit value is exactly reached. It may however be advantageous under certain circumstances, for instance when the transition line between the base region and the at least one achromatic region, which is determined by the sum of the transition points, is intended to be configured as simply as possible, for instance in the form of a semicircle, to place the transition point in particular cross sections in a point in which the transverse chromatic aberration is less than the transverse chromatic aberration limit value.

In another refinement of the method according to the first aspect, the at least one first transition point is established by ascertaining a distribution of a transverse chromatic aberration for the user on the back surface of the first lens element, and the at least one first transition point is set at a point on the back surface of the first lens element at which the transverse chromatic aberration is less than or equal to a predetermined transverse chromatic aberration limit value.

In particular, in this way it is possible first to establish the basic design of the first lens element and to ascertain therefor the profile of the transverse chromatic aberration for the user or for the principal rays coming from the eye rotation point of the user at pass points of these principal rays through the back surface of the first lens element, and then to set, on the back surface, corresponding transition points at which the transverse chromatic aberration is less than or equal to, in particular equal to, a predetermined transverse chromatic aberration limit value. From the sum or by interpolation of the transition points, transition lines are then obtained which delimit the base region from the achromatic region. The achromatic region need not necessarily be a continuous surface in this case and it may also be formed from subsurfaces not connected to one another. In order to keep the profile of the transition lines, or boundary lines, between the base region and the achromatic region geometrically simple, certain transition points may therefore also be set at points on the back surface of the first lens element at which the transverse chromatic aberration is less than the transverse chromatic aberration limit value.

In this way, on the basic design of a first lens element, the first back surface region is obtained which forms the base region and, in the base region, the back surface of the spectacle lens. The front and back surfaces of the second lens element, or the interfaces of the achromatic region and, on the basis of the front surface of the second lens element, the correspondingly complementary configuration of the second back surface region of the first lens element, are then to be determined.

In another refinement of the method according to the first aspect, the calculation wavelength may be 546.074 nm and the Abbe number may be determined according to the equation $$V = \frac{n_e - 1}{n_{F'} - n_{C'}},$$

where V is the Abbe number, $n_e$ is the refractive index of the respective material at the calculation wavelength, $n_{F'}$ is the refractive index of the respective material at a wavelength of 479.9914 nm and $n_{C'}$ is the refractive index of the respective material at a wavelength of 643.8469 nm.

This calculation of the Abbe number corresponds to the more recent convention for determining the Abbe number, which specifies the e-line as a reference wavelength. In principle, of course, a reference wavelength other than the a-line may also be selected. What is important is only that the all the calculations are carried out with respect to the same reference wavelength and that the first material and the second material have different Abbe numbers at the same reference wavelength.

In one refinement of the method according to the first aspect, an optical axis or a zero visual line of the user may extend through the base region.

In this configuration case, the base region is arranged approximately at the centre, or geometrical centre, of the spectacle lens and extends around it. The smallest vision angles occur in this region, and the chromatic aberrations, i.e. including the transverse chromatic aberration, are consequently also at the least in this region.

In another refinement, the achromatic region may extend in the first cross-sectional plane from the at least one first transition point to an edge of the spectacle lens.

As mentioned above, a "spectacle lens" is intended to mean both the uncut spectacle lens, or the semifinished product, and the edged spectacle lens. Consequently, the "edge" may be either the edge of the uncut spectacle lens or the edge of the cut, edged spectacle lens.

In general, the chromatic aberrations, and in particular also the trans-verse chromatic aberration, increase with an increasing vision angle, i.e. in the periphery of the spectacle lens. An extent of the achromatic region starting from the transition point as far as the edge is therefore recommendable in order to achieve an at least partial achromatic effect in this region of the spectacle lens.

In one refinement of the production method according to the second aspect of the invention, the connecting step may be carried out by cementing the first lens element and the at least one second lens element.

During the cementing, neighbouring surfaces, in the present case the second back surface region of the first lens element and the front surface of the second lens element, are bonded together by means of a thin transparent cement layer. For example, a synthetic resin may be used for this. Furthermore, in principle it is possible for the first lens element and the at least one second lens element to be connected by contact bonding. This type of manufacture is also referred to as molecular adhesion. In this case, the surfaces of the first and second lens elements are connected to one another by molecular attraction forces. These manufacturing techniques are known in principle to the person skilled in the art.

According to one refinement of the spectacle lens according to the fourth aspect of the invention, the spectacle lens may have two transition points in the first cross-sectional plane, the respective first tangent and the respective second tangent intersecting one another at each of the two transition points.

In principle, the achromatic region need not extend surface-wide on the back surface of the spectacle lens. It may be sufficient to set the achromatic region only in a particular angle range. In principle, therefore, only one transition point may be provided in the cross-sectional plane. Naturally, however, the achromatic region may also be provided surface-wide, for instance if the spectacle lens is formed rotationally symmetrically. In that case, the spectacle lens respectively has two transition points in the first cross-sectional plane, or in each of the cross-sectional planes. At each of the transition points in the respective cross-sectional plane, the tangent of the base region, i.e. the first tangent, at the respective transition point and the tangent of the achromatic region, i.e. the second tangent, at the respective transition point intersect one another.

In another refinement of the invention, the first tangent and the second tangent may intersect one another at at least one first transition point in an axial position range of at least 160°.

As already mentioned in the introduction, an "axial position range" is intended to mean a position of the first cross-sectional plane and of the further cross-sectional planes with respect to an angle relative to the plane of the spectacle lens conventionally denoted as the Y-Z plane. The degree information may therefore be interpreted in a similar way to the degree information according to the TABO scheme known to the person skilled in the art. For example, the at least one first transition point may therefore be provided only with an axial position range of 165° in a lower half of the spectacle lens. Correspondingly, the second lens element is then for example also arranged only in this lower half of the spectacle lens. As an alternative, if the achromatic region extends from the transition point to an edge of the spectacle lens, it is also possible for example to formulate that the achromatic region extends over a range of at least 120° of the edge of the spectacle lens, or of the edge region.

In another refinement of the spectacle lens according to the fourth aspect of the invention, the respective first tangent of the first back surface region and the respective second tangent of the back surface of the at least one second lens element may intersect one another in each cross-sectional plane of the spectacle lens.

Correspondingly, in this case the achromatic region extends fully, i.e. over 360° of the edge of the spectacle lens.

In this case, a low transverse chromatic aberration value is provided without power discontinuities at the transition from the base region to the achromatic region over the entire circumference of the spectacle lens.

In another refinement of the spectacle lens according to the fourth aspect of the invention, the first lens element may be arranged in the base region and in the achromatic region, a front surface of the spectacle lens being formed by a front surface of the first lens element, a second back surface region of the first lens element and a front surface of the at least one second lens element being contiguous in the achromatic region, and the front surface and the back surface of the at least one second lens element converging on the at least one first transition point in the at least one first cross-sectional plane and forming a wedge edge angle between them.

In this way, a compact structure of the spectacle lens is provided. The contiguous front surface of the second lens element and second back surface in the region of the first lens element avoid an air gap and allow manufacture of the spectacle lens for example by means of cementing or contact bonding.

In one refinement of the spectacle lens according to the fourth aspect of the invention, the front surface of the first lens element and/or the first back surface region of the first lens element may be spherical.

In another refinement of the spectacle lens according to the fourth aspect of the invention, the front surface of the at least one second lens element and/or the back surface of the at least one second lens element may have a constant curvature in the first cross-sectional plane.

As already explained above for the method according to the first aspect, designing the surfaces of the at least one second lens element with a constant curvature has the advantage that they can be manufactured with relatively simple means.

In another refinement of the spectacle lens according to the fourth aspect, a centre of curvature of the front surface of the at least one second lens element and/or of the back surface of the at least one second lens element in the at least one first cross-sectional plane may lie outside a symmetry axis of the front surface of the at least one second lens element or respectively of the back surface of the at least one second lens element.

This configuration of the spectacle lens allows free selection of the kink angle at a transition point between the back surface of the second lens element and the first back surface region of the first lens element, in which case a shape with constant curvature may be retained for the back surface of the second lens element. Overall, owing to the position of the centre of curvature outside the symmetry axis, there is then a toric surface for the front or back surface of the second lens element, respectively.

In one refinement of the spectacle lens according to the fourth aspect of the invention, the front surface of the at least one second lens element and/or the back surface of the at least one second lens element may be aspherical, i.e. not spherical.

In particular, the front surface of the at least one second lens element and/or the back surface of the at least one second lens element may be formed by a second- or higher-order polynomial, in particular by a third- or fourth-order polynomial, in the cross-sectional plane. In particular, the aspherical front surface of the at least one second lens element and/or the aspherical back surface of the at least one second lens element may be rotationally symmetrical with respect to an optical axis of the spectacle lens, or rotationally non-symmetrical.

As already mentioned above, in particular formation by means of a third-or higher-order polynomial permits at least one further degree of freedom despite the specification of the kink angle, of the wedge edge angle, of the second radius of curvature and of the first radius of curvature, so that for example the edge thickness of the spectacle lens can be minimized.

In another refinement of the spectacle lens according to the fourth aspect, the spectacle lens may be rotationally symmetrical with respect to an optical axis.

In this case, a particularly simple geometrical structure of the spectacle lens is obtained. Particularly in the case of a correction to be carried out by a monofocal lens, this simple structure may be sufficient in order to provide a required prescription effect for a user.

In another refinement of the spectacle lens according to the fourth aspect, the first cross-sectional plane or each cross-sectional plane may be a meridian plane of the spectacle lens.

If the spectacle lens has an optical axis, the first cross-sectional plane or each cross-sectional plane may therefore be a meridian plane. The position of the kink on the back side of the spectacle lens is for relatively large vision angles starting from a relaxed position of the eye of an intended user, so that in particular the vision can be improved in a peripheral edge region of the spectacle lens.

In another refinement of the spectacle lens according to the fourth aspect of the invention, the cross-sectional plane or each cross-sectional plane may contain a geometrical centre axis of the spectacle lens.

The "geometrical centre axis" in this case extends through a geometrical centre for the boxing system of the uncut or edged spectacle lens. Often, the geometrical centre in the uncut spectacle lens will be sufficient. In the case of rotationally non-symmetrical shapes of the intended frame or of the edged spectacle lens, however, the previous configuration and therefore in the end the structural shaping of the spectacle lens may be oriented on a geometrical centre of the edged spectacle lens.

The geometrical centre axis then extends through the geometrical centre parallel to a main fixation direction through the spectacle lens. The main fixation direction is in particular parallel to a symmetry axis of the front surface of the first lens element, if the front surface of the first lens element is formed rotationally symmetrically.

In another configuration of the spectacle lens according to the fourth aspect, the first cross-sectional plane or each cross-sectional plane may extend through the spectacle lens in such a way that it divides the spectacle lens in a normal plane perpendicular thereto into two equally large areas.

Under certain circumstances, owing to the geometrical configuration of the front surface and/or of the back surface of the spectacle lens, or of the first lens element and of the second lens element, a position of the geometrical centre may be difficult to ascertain, or there may be no optical axis. To this extent, a possible main fixation line, starting from which a design of the spectacle lens is suitable for avoiding chromatic aberrations in a peripheral field of view, may likewise be difficult to ascertain. The cross-sectional planes may then be arranged by dividing the spectacle lens, i.e. the uncut or edged spectacle lens, in a normal plane which extends perpendicularly to the cross-sectional plane, into two equally large areas. The normal plane is therefore the X-Y plane of the spectacle lens, in which the box frame of the spectacle lens is also specified.

In another configuration, spectacles having a frame and a first and a second spectacle lens may be provided, the first and/or the second spectacle lens being a spectacle lens according to the fourth aspect of the invention or one of its configurations, the cross-sectional plane or each cross-sectional plane of the respective spectacle lens containing a geometrical centre of the respective spectacle lens and extending as a normal to a plane of the spectacle plane of the spectacles, the plane of the spectacle plane containing the vertical centrelines of the box of the first and second spectacle lenses.

In this way, the cross-sectional plane may also be defined with the aid of the finished spectacles.

In another configuration of the spectacle lens according to the fourth aspect, the front surface of the lens element may be formed convexly and the first back surface region of the first lens element may be formed concavely.

In the context of the present application, the terms "convex" and "concave" are given in the context of the conventional usage of these terms, namely when externally viewing the corresponding surface of the spectacle lens. If the surface curves away from the observer for an external view of the spectacle lens, the surface is consequently convex. If the surface curves towards the observer, it is consequently concave.

Such formation of the first lens element as a so-called meniscus allows a possibility for correction according to a required prescription effect and, at the same time, straightforward manufacture.

In another configuration of the spectacle lens according to the fourth aspect, the second back surface region of the first lens element may be formed convexly, a front surface of the at least one second lens element being formed concavely and a back surface of the at least one second lens element being formed concavely.

In this way, a particularly straightforward possibility for manufacture of the spectacle lens can be provided. In particular, in the case of a negative kink angle, the possibility is provided that the first lens element and the second lens element may be connected together first. Only then is the back surface of the second lens element optionally to be ground.

Furthermore, a refinement of the spectacle lens according to the fourth aspect may be provided in that the second back surface region of the first lens element is formed concavely, a front surface of the at least one second lens element being formed convexly and a back surface of the at least one second lens element being formed concavely.

In this case as well, particularly in the case of a negative kink angle at the transition point in the cross-sectional plane, particularly straightforward manufacture of the spectacle lens can be carried out. In particular, here again the back surface of the second lens element may possibly not be processed until the first lens element and the second lens element have already been connected together.

As already mentioned above, in one refinement of the spectacle lens according to the fourth aspect of the invention the front surface of the at least one second lens element and the second back surface region of the first lens element may be cemented together.

As an alternative, for example, the first lens element and the second lens element may be contact-bonded to one another.

In one refinement of the spectacle lens, an optical axis of the spectacle lens or a geometrical centre axis of the spectacle lens may extend through the base region.

This ensures that the achromatic region extends in a peripheral region of the spectacle lens, in which the chromatic aberrations are in principle greater.

Furthermore, a refinement of the spectacle lens according to the fourth aspect may be provided in that the achromatic region extends in the first cross-sectional plane from the at least one first transition point to an edge of the spectacle lens.

In this way, it is possible to ensure that an at least partial achromatic effect of the achromatic region in the periphery of the spectacle lens extends as far as the edge of the spectacle lens and the transverse chromatic aberration is therefore reduced at the possible outer edge of a peripheral field of view of a user of the spectacle lens.

It is to be understood that the features mentioned above and those yet to be explained below may be used not only in the combination respectively indicated, but also in other combinations or separately, without departing from the scope of the present invention.

BRIEF DESCRIPTION OF THE SEVERAL VIEWS OF THE DRAWING

Embodiments of the invention are represented in the drawing and will be explained in more detail in the description below.

DETAILED DESCRIPTION OF THE INVENTION

Figure 1:
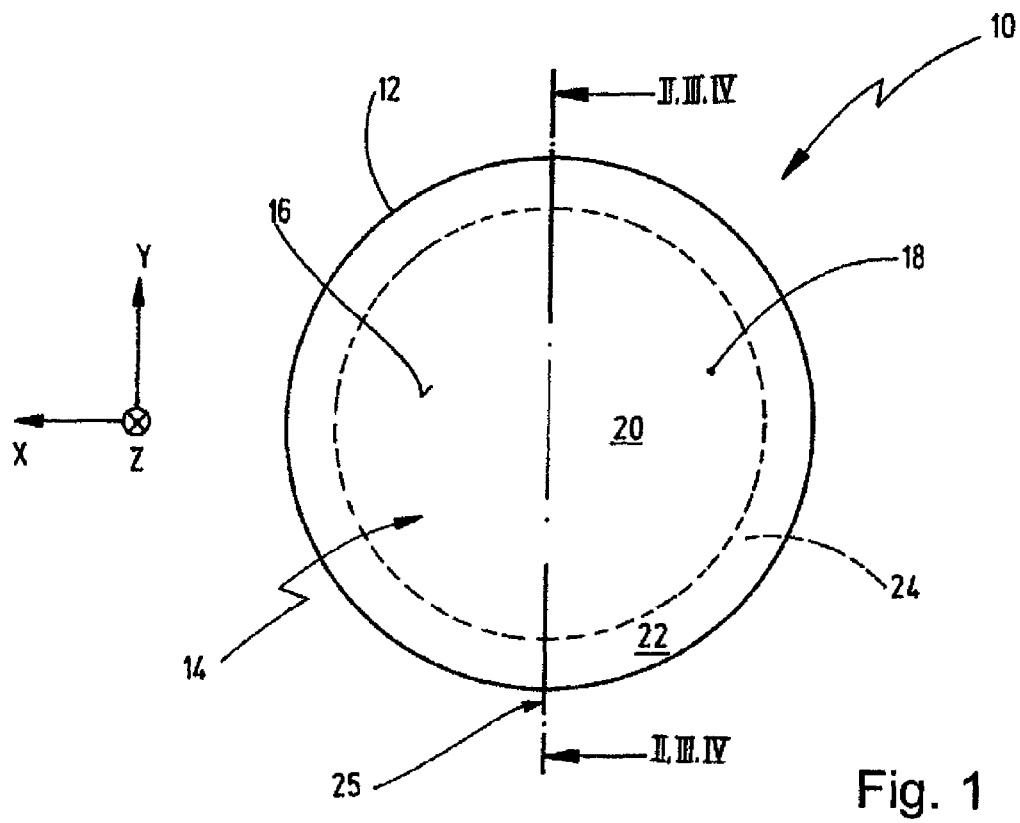
FIG. 1 shows a plan view onto the front surface of an embodiment of a spectacle lens.

FIG. 1 shows a plan view of an embodiment of a spectacle lens 10. In a conventional coordinate system, this plan view lies in the X-Y plane and the Z axis extends in the direction of a user of the spectacle lens, i.e. into the image plane in the view represented in FIG. 1.

The plan view is made at least onto a front surface 14 of the spectacle lens. The front surface 14 of the spectacle lens is formed by the front surface of a first lens element 18. A dashed line schematically indicates that a back surface (on the far side of the spectacle lens in FIG. 1) has a base region 20 and an achromatic region 22. In the exemplary embodiment represented, the spectacle lens 10 is formed rotationally symmetrically so that the achromatic region 22 extends fully along the periphery of the spectacle lens 10 around the base region 20. The achromatic region 22 is the region in which the back surface of the spectacle lens is arranged by a second lens element 24 (therefore, in the representation in FIG. 1, merely on the far side of the spectacle lens).

A cross section 25 through the spectacle lens is indicated by means of a dashed line. This sectional representation is explained in FIG. 2.

Figure 2:
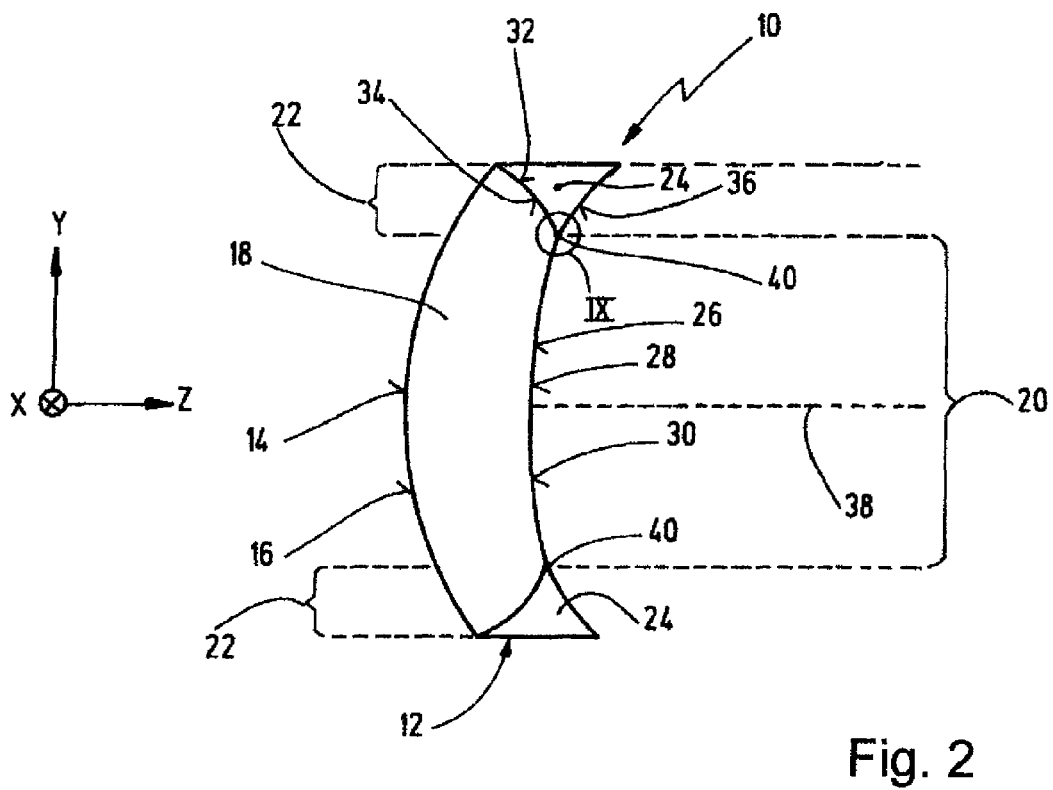
FIG. 2 shows an embodiment of a cross section of the spectacle lens in FIG. 1 along a section line II-II.

FIG. 2 shows a representation of the cross section along a section line II-II of the spectacle lens in FIG. 1. In this representation, it is clear that the spectacle lens 10 comprises the first lens element 18 and the second lens element 24. The spectacle lens 10 has a back surface 26. The first lens element 18 has a back surface 28. The back surface 28 of the first lens element 18 in turn has a first back surface region 30 and a second back surface region 32.

The first back surface region 30 forms a part of the back surface 26 of the spectacle lens 10. This region is the base region 20.

Furthermore, the second lens element 24 is provided. The second lens element 24 has a front surface 34 of the second lens element 24 and a back surface 36 of the second lens element 24. The front surface 34 of the second lens element adjoins the second back surface region 32 of the first lens element 18. This is intended to mean that no air gap is formed between the surfaces. The surfaces may, for example, be cemented together or contact-bonded together.

The back surface 36 of the second lens element 24 forms a further part of the back surface 26 of the spectacle lens 10. This further region is the achromatic region 22. In other words, the base region 20 is therefore defined by the first back surface region 30. The achromatic region 22 is defined by the back surface 36 of the second optical element 24.

In the cross-sectional view represented in FIG. 2, the spectacle lens 10 has an optical axis 38. A light ray passing through the spectacle lens 10 along the optical axis 38 is not deviated. The spectacle lens 10 represented in FIGS. 1 and 2 is furthermore rotationally symmetrical with respect to the optical axis 38. The cross section is a meridian section through the spectacle lens 10. This, however, is not compulsory. The spectacle lens 10 need not be rotationally symmetrical with respect to the optical axis 38. Furthermore, embodiments of the spectacle lens 10 may not actually have an optical axis 38.

The first back surface region 30 and the back surface of the second element 24 merge into one another at a transition point 40 on the back surface 26 of the spectacle lens 10. In particular, the transition point has been established in such a way that a transverse chromatic aberration for a user of the spectacle lens 10 reaches a transverse chromatic aberration limit value which has been defined as perturbing for the user. Consequently, the achromatic region 22 with the second lens element 24 follows on from the transition point 40 in the direction of an edge 12 of the spectacle lens 10. The second lens element 24 comprises a second material, the Abbe number of which differs from a first material of the first lens element 18. In this way, the first lens element 18 and the second lens element 24 can interact achromatically. The cross section represented in FIG. 2 has two transition points 40 owing to the symmetry of the spectacle lens 10. This, however, is not compulsory in principle. There may also be only one transition point 40 in the cross section 25.

Figure 9:
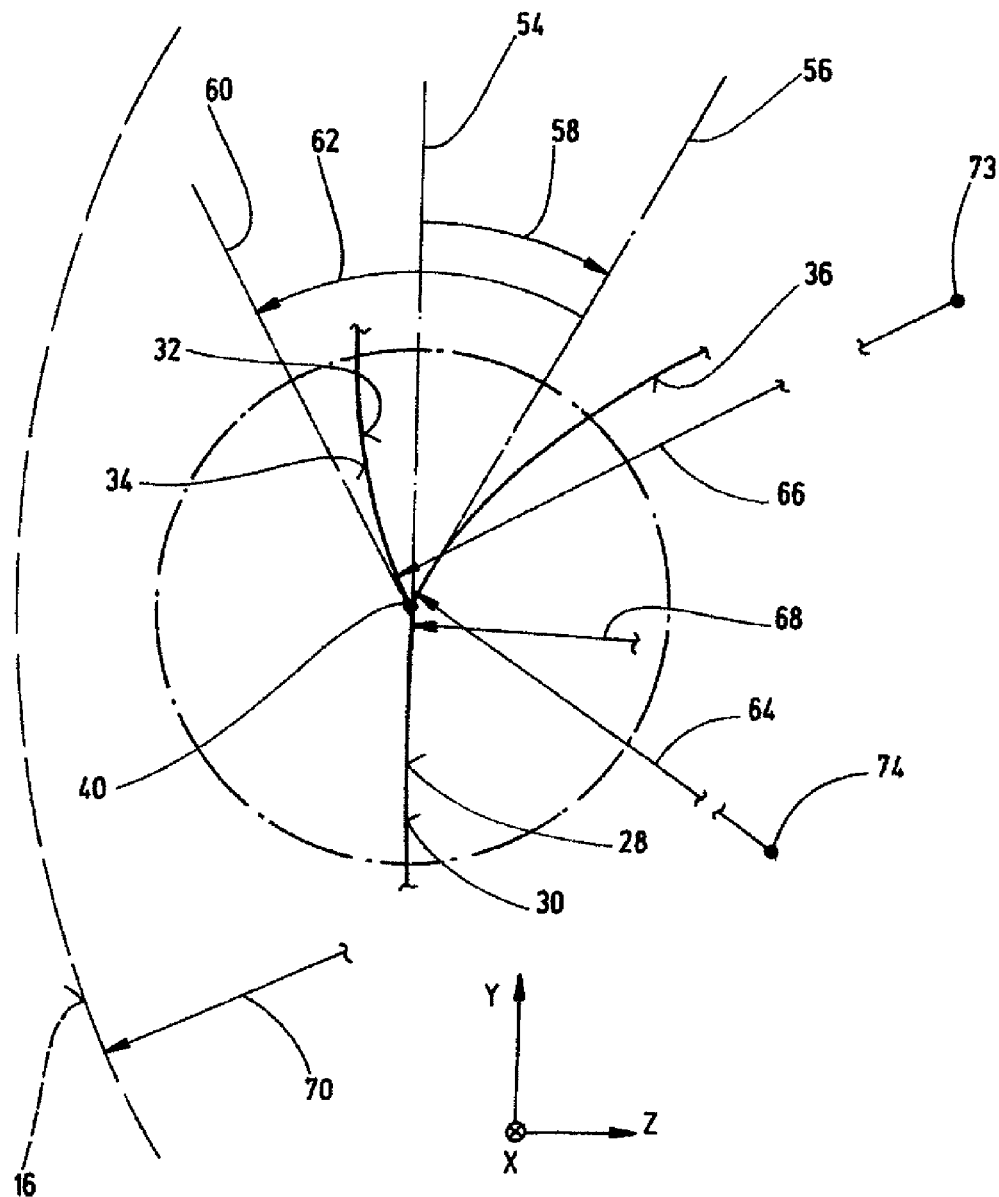
FIG. 9 shows a detail view IX in FIGS. 2, 3 and 4.

The partial view of a vicinity of a transition point 40 is represented in FIG. 9 and will be explained in more detail below.

Figure 3:
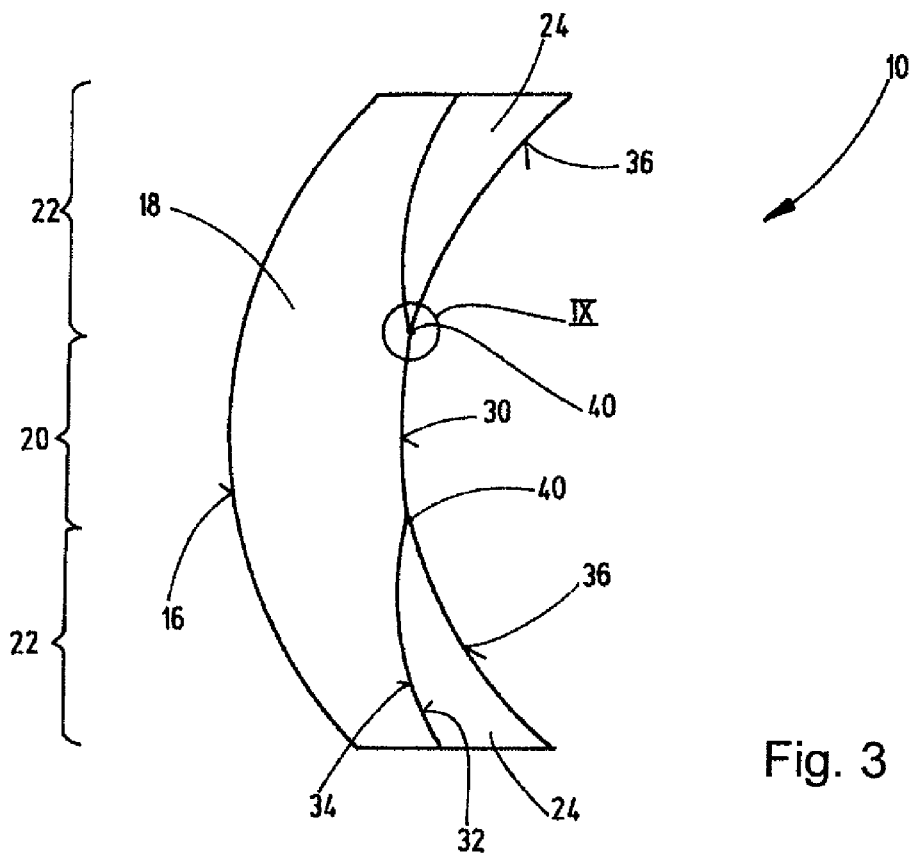
FIG. 3 shows another possible embodiment of a cross-sectional view of the spectacle lens in FIG. 1 along a section line III-III in FIG. 1.

FIG. 3 represents another possible cross section 25 of the spectacle lens 10. Identical elements are denoted by the same references and will therefore not be explained again below. Only the differences will be discussed below.

The exemplary embodiment represented in FIG. 3 differs from the exemplary embodiment represented in FIG. 2 in terms of the configuration of the front surface 34 and of the back surface 36 of the second lens element 24. In the embodiment in FIG. 2, the front surface 34 is formed concavely and the back surface 36 is likewise formed concavely. Conversely, however, in FIG. 3 the front surface 34 of the second lens element 24 is formed convexly and the back surface 36 of the second lens element 24 is formed concavely. Correspondingly complementarily, the second back surface region 32 is formed concavely. For the cross section in FIG. 3, the spectacle lens 10 is thus formed overall as a meniscus and the second lens element 24 is also formed as a meniscus. The cross section represented in FIG. 3 likewise has two transition points 40. A vicinity of the transition points 40 is likewise represented schematically in FIG. 9.

Figure 4:
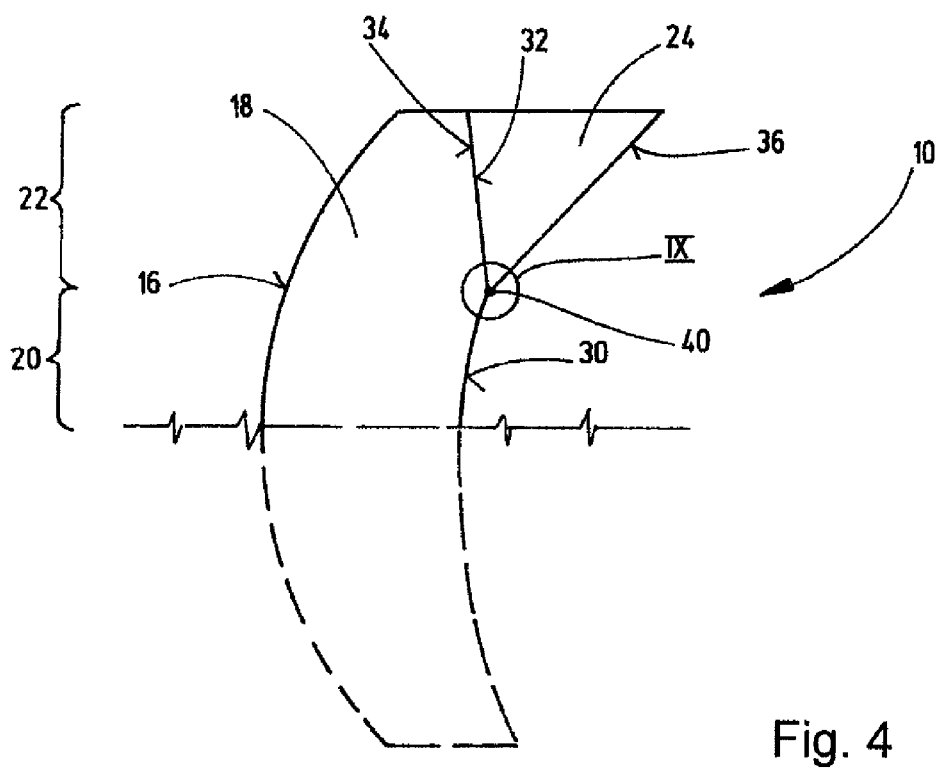
FIG. 4 shows yet another possible embodiment of a cross section of the spectacle lens in FIG. 1 along a section line IV-IV in FIG. 1.

FIG. 4 schematically represents another possible embodiment of the cross section 25 of the spectacle lens 10. The identical elements are in turn denoted by the same references and will not be described again. Only the differences will be discussed below.

In principle, it is not absolutely necessary for the spectacle lens 10 to be configured rotationally symmetrically. It may therefore be the case that the spectacle lens 10 has only one transition point 40 in a cross section. The configuration of a second half of the cross section 25, indicated with a dashed line in FIG. 4, is therefore in principle arbitrary. It may be the case that in the lower part of the cross section, indicated merely by dashes, the base region 20 is fully continued, and therefore a second lens element 24 is not provided in this part of the cross section.

Figure 5:
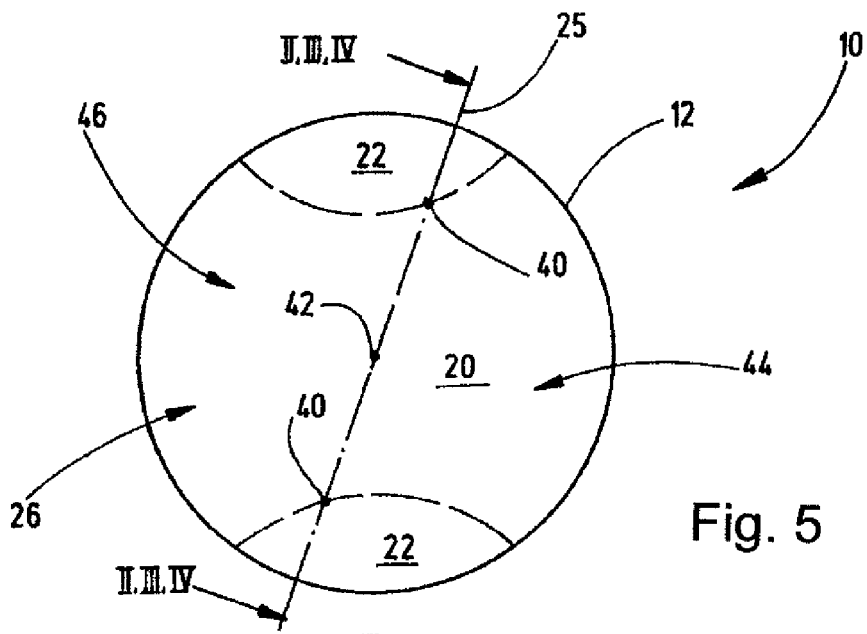
FIG. 5 shows another embodiment of a spectacle lens with a view onto the front surface; the cross-sectional views represented in FIGS. 2, 3 and 4 may also be employed in this spectacle lens.

FIG. 5 represents another embodiment of a spectacle lens 10. The cross section may in principle be formed according to one of the embodiments in FIGS. 2 to 4. The view in FIG. 5 is likewise made onto the front surface of the spectacle lens 10. Identical elements are denoted by the same references and will not be described again. Only the differences will be discussed below.

As can be seen in FIG. 5, the spectacle lens 10 is not formed rotationally symmetrically in this embodiment. The achromatic region is formed merely in an upper and a lower part of the spectacle lens 10, i.e. it reacts for turning of the fixation direction during use of the spectacle lens 10 in the vertical direction. It is therefore not absolutely necessary for the achromatic region 22 to be a continuous part of the back surface 26 of the spectacle lens. The achromatic region 22 may also be formed from a plurality of subregions, as in FIG. 5 from two subregions. In this embodiment as well, two transition points 40 are provided in the cross-sectional plane 25.

Under certain circumstances, it may be the case that the spectacle lens 10, for instance the spectacle lens 10 represented in FIG. 5, does not have an optical axis 38. A geometrical centre axis can thus be defined for the position of the cross-sectional plane 25. The geometrical centre axis extends through the geometrical centre of the uncut spectacle lens. In FIG. 5, the spectacle lens 10 is represented uncut, i.e. still circular. The geometrical centre then lies at the circle centre. In principle, however, the geometrical centre may also be established with the aid of the edged spectacle lens 10. The geometrical centre axis 42 then extends parallel to an intended main fixation direction through the spectacle lens 10 through the geometrical centre. The cross-sectional plane 25 then contains the geometrical centre axis 42.

As an alternative definition, the cross-sectional plane 25 in the plan view onto the spectacle lens as represented in FIG. 5 may be established as dividing a surface in a normal plane which is perpendicular to the cross-sectional plane 25 into two equally large surface components. For example, in FIG. 5 a first surface component is denoted by 44 and a second surface component is denoted by 46. In the case of an uncut circular spectacle lens blank, the cross-sectional plane 25 therefore extends in such a way that it intersects the entire diameter of such an uncut semifinished spectacle lens product.

How to define the position of a cross-sectional plane 25 therefore depends on the properties of the spectacle lens. In the simplest case, the spectacle lens 10 is rotationally symmetrical, so that the cross-sectional plane 25 is a meridian plane of the spectacle lens 10, which contains the optical axis 38. In the case of a rotationally non-symmetrical spectacle lens 10, the simplest definition for the uncut spectacle lens 10 is one in which the cross-sectional plane 25 extends through the geometrical centre axis 42 and contains the latter, or it divides a surface of the spectacle lens 10 in a normal plane perpendicular to the cross-sectional plane 25 into two equally large surface components 44, 46.

If the position of the cross-sectional plane is intended to be established for the edged spectacle lens, or if there is decentration, then a cross-sectional plane may contain a main fixation direction coming from an eye rotation point through the spectacle lens, as will be explained in more detail below.

Figure 6:
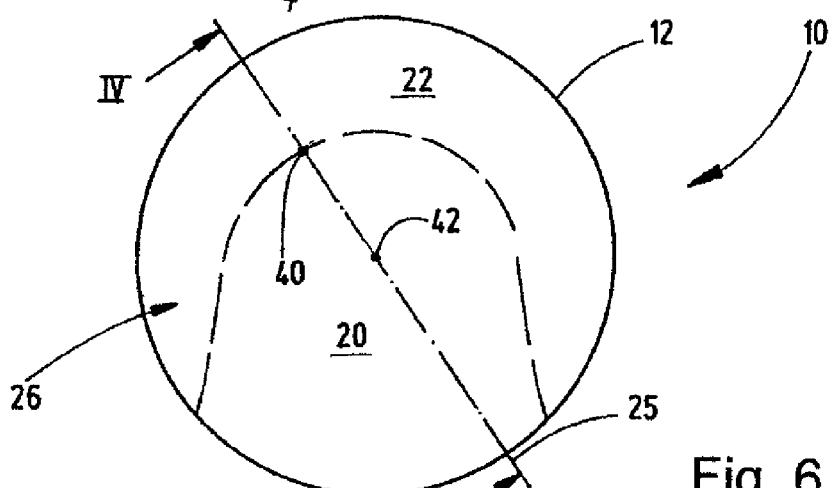
FIG. 6 shows yet another embodiment of a spectacle lens in a view onto the front surface; for example, the cross section in FIG. 4 may be a cross section of this spectacle lens.

FIG. 6 represents yet another possible embodiment of the spectacle lens 10. In this embodiment, the cross section 25 may for example be formed as represented in FIG. 4. In the embodiment represented, the achromatic region 22 does not extend fully over the entire edge 12 of the spectacle lens 10. Such a spectacle lens 10 therefore has cross-sectional planes 25 which have only one transition point 40.

Figure 7:
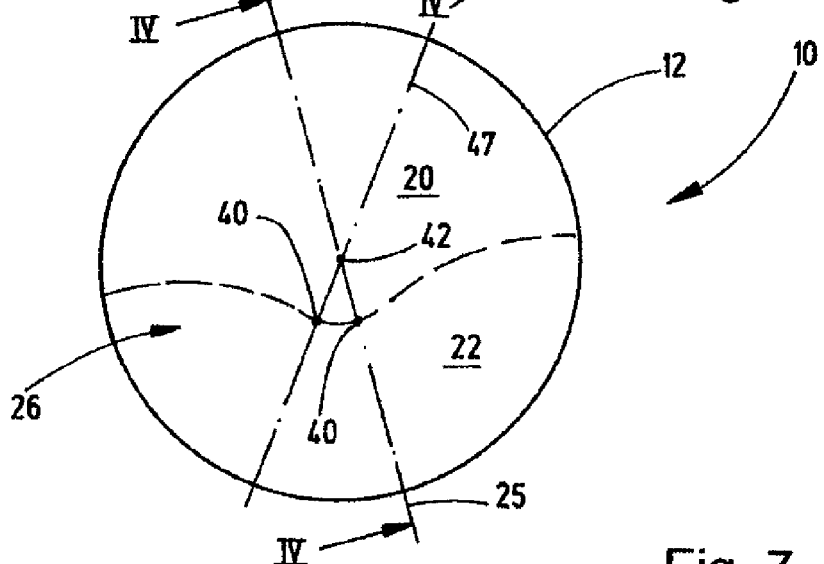
FIG. 7 shows yet another embodiment of a spectacle lens; for example, the cross section in FIG. 4 may show one or more cross sections of this exemplary embodiment.

FIG. 7 represents yet another possible embodiment of a spectacle lens 10. In this case, the achromatic region 22 is provided only in a lower region of the spectacle lens 10. The remaining part of the spectacle lens 10 is the base region 20.

A cross-sectional plane 25 may then in turn have only one transition point 40. Of course, other cross-sectional planes 47 which likewise have at least one transition point 40 may furthermore be placed through the spectacle lens. For example, the cross-sectional plane 25 may then be formed as represented in the cross-sectional view in FIG. 4.

Figure 8:
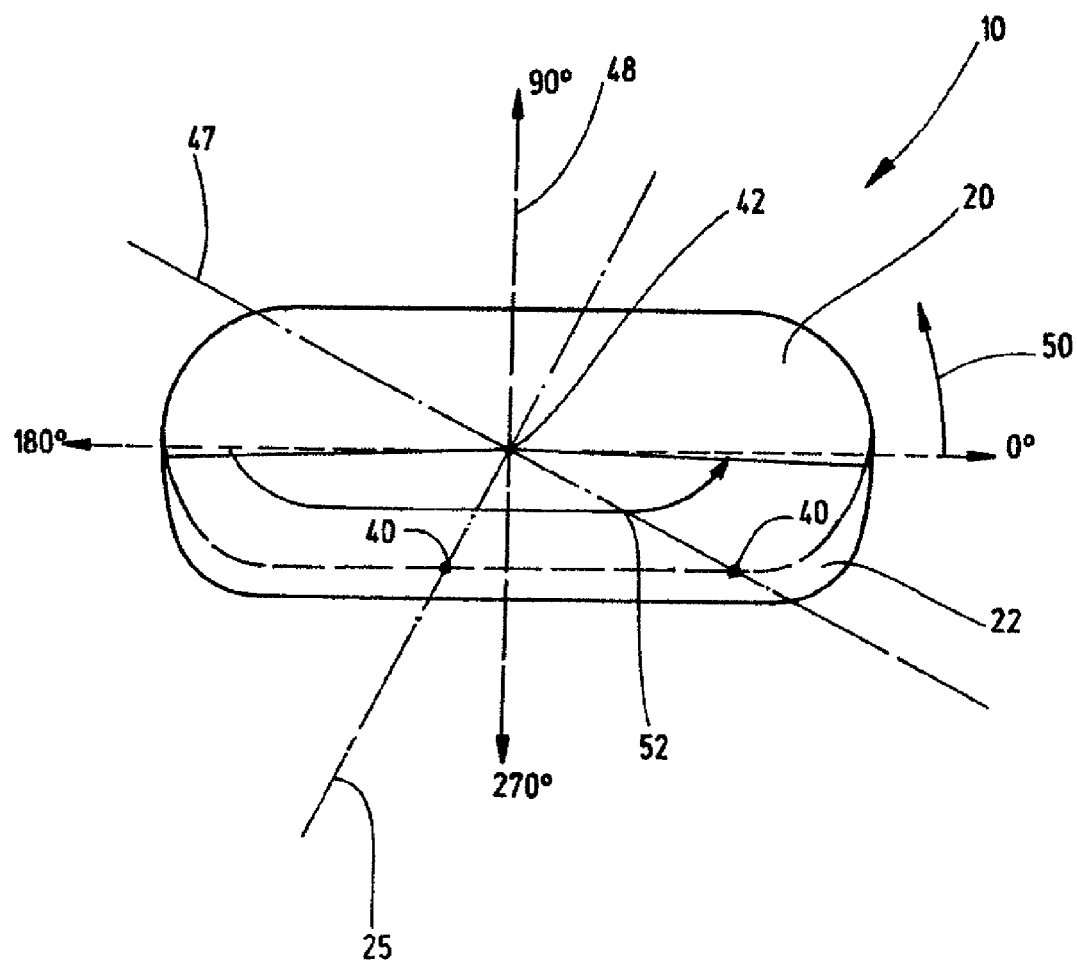
FIG. 8 shows a schematic representation of a spectacle lens, which is already edged, an axial position range being represented.

FIG. 8 represents an edged spectacle lens 10. The edged spectacle lens 10 in FIG. 8, formed from an essentially circular semifinished spectacle lens product or uncut spectacle lens, then has an essentially rectangular shape with rounded edges.

The representation in FIG. 8 will explain how the terms "axial position angle" or "axial position range" are to be interpreted in the context of the application. In a box frame of the spectacle lens 10 in FIG. 8, a geometrical centre of the spectacle lens 10 can be found. For an intended main fixation direction through the spectacle lens 10, the geometrical centre axis 42 then extends through the spectacle lens 10. Possible cross-sectional planes 25, 47 then contain this geometrical centre axis 42. Starting from the geometrical centre as the origin, in a similar way to the so-called TABO scheme for determining the base position of a prismatic power, a plurality of axes 48 can then be defined and a corresponding axial position angle 50 can be specified. A so-called "axial position range" is then a range of axial position angles 50. An example of an axial position range 52 is denoted by an arrow and comprises an extent of about 170°. In this way, it is possible to describe an extent of the achromatic region over the circumference of the spectacle lens. In particular, the achromatic range may therefore extend over an axial position range of at least 160°, in particular at least 170°, in particular at least 180°. In the axial position range 52, the cross-sectional planes 25, 47 in this case have at least one transition point 40.

FIG. 9 represents a detail view IX in FIGS. 2, 3 and 4.

Identical elements are in turn denoted by the same references and will not be described again.

At the transition point 40, the first back surface region 30, the front surface 34 of the second lens element 24 and the back surface 36 of the second lens element 24 are contiguous. The first back surface region 30 has a tangent 54 at the transition point 40, i.e. infinitesimally closely approximated to the transition point 40, in the cross-sectional plane 25. The back surface 36 of the second lens element 24 has a tangent 56 at the transition point 40. The tangent 54 and the tangent 56 intersect one another and therefore include a kink angle 58. The back surface 26 of the spectacle lens 10 therefore has a kink at the transition point 40. The back surface 26 of the spectacle lens 10 is therefore not continuously differentiable at the transition point 40. The first derivative of the surface function has a discontinuity at this position. A positive kink angle 58 means that the back surface 36 of the second lens element 24 kinks in the direction of an intended user of the spectacle lens 10. Correspondingly, the effect of a negative kink angle 58 is that the back surface 36 of the second lens element 24 kinks away relative to the first back surface region 30 from an intended user of the spectacle lens 10. In the cross-sectional plane 25 or—in the example represented—in the Y-Z plane, an angle from the tangent 54 of the first back surface region 30 onto the tangent 56 of the back surface 36 of the second lens element 24 is therefore positive.

A tangent of the front surface 34 of the second lens element 24 at the transition point 40 in the cross-sectional plane 25 is denoted by a reference 60. An angle between the tangent 56 of the back surface 36 at the transition point 40 and the tangent 60 of the front surface 34 at the transition point 40 is denoted by a reference 62, and is the so-called wedge edge angle 62. This refers to the prism wedge of the second lens element 24 at the transition point 40. A first radius of curvature 64 of the back surface 36 of the second lens element 24 at the transition point 40 is denoted by a reference 64. The corresponding centre of curvature of the first radius of curvature 64 is schematically denoted by a reference 74.

A second radius of curvature 66 of the front surface 34 of the second lens element 24 at the transition point 40 is denoted by a reference 66. The corresponding centre of curvature of the second radius of curvature 66 is schematically denoted by the reference 73. A fourth radius of curvature 68 of the back surface 28 of the first lens element 18 at the transition point 40 is denoted by the reference 68.

Furthermore, a third radius of curvature, or a first radius 70 of the front surface 16 of the first lens element 18, is denoted schematically.

Figure 10:
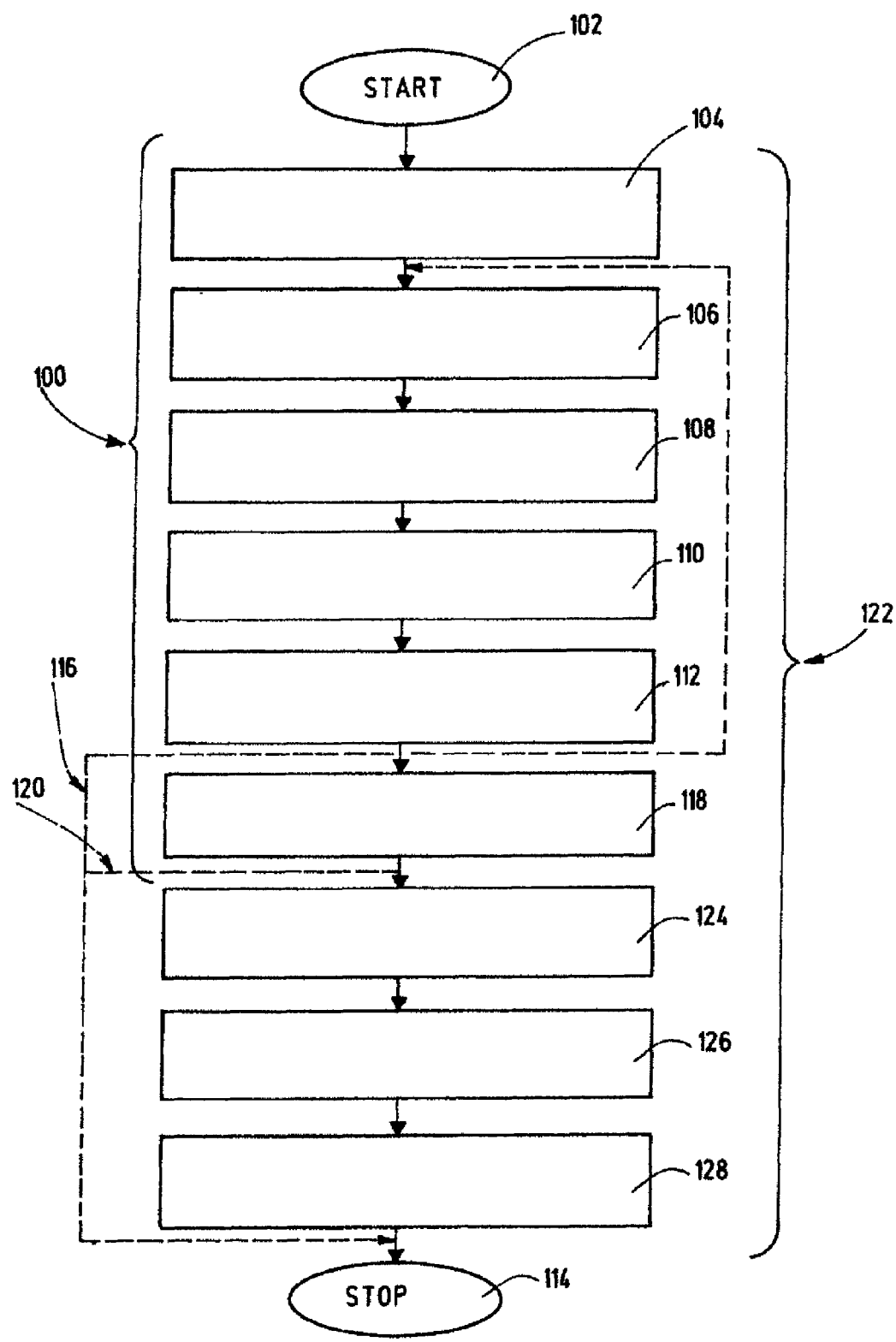
FIG. 10 shows a schematic flow chart of an embodiment of a method for designing a spectacle lens and of a method for producing a spectacle lens.

FIG. 10 represents a schematic flow chart of a method 100 for designing the spectacle lens 10.

The method begins with a start step 102. Initially, first establishment of a first material of the first lens element 18 and of a second material of the second lens element 24 is carried out in a step 104. In particular, the materials are to be selected in such a way that the Abbe numbers of the first lens element and of the second lens element are different from one another, so that they can interact at least partially achromatically.

In an ascertainment step, the at least one transition point 40 between the base region 20 and the achromatic region 22 on the back surface 26 of the spectacle lens 10 is ascertained in a first cross section 25 of the spectacle lens. In this case, in particular, the at least one first transition point 40 may be ascertained in such a way that a transverse chromatic aberration for the user of the spectacle lens 10 at the transition of at least one first transition point 40 is less than a predefined transverse chromatic aberration limit value or equal to a predefined transverse chromatic aberration limit value.

Once the at least one first transition point 40 has thereby been established in the cross-sectional plane 25, a first determination step 108 is carried out. It is to be understood that, in the case of a rotationally symmetrical spectacle lens 10, there are two transition points 40 in each of the cross-sectional planes 25. In the first determination step 108, the wedge edge angle 62 is determined and the kink angle 58 is determined. The wedge edge angle and the kink angle are determined in such a way that a prismatic power for the user of the spectacle lens in the base region 20 at the transition point 40 and in the achromatic region 22 at the transition point 40 correspond to one another. There is therefore no discontinuity in the prismatic power at the transition point 40. Furthermore, by the two degrees of freedom of the wedge edge angle and the kink angle, it is possible to establish the discontinuity by which the transverse chromatic aberration changes at the transition point 40.

In a second establishment step 110, the first radius of curvature 64 on the back surface 36 of the at least one second lens element 24 in the cross-sectional plane 25 at the transition point 40 is established.

On the basis of this, in a second determination step 112, the second radius of curvature 66 of the front surface 34 of the at least one second lens element 24 in the cross-sectional plane 25 is determined. In this case, the second radius of curvature 66 is determined in such a way that a spherical power and an astigmatic power of the spectacle lens in the base region at the transition point 40 and a spherical power and an astigmatic power of the spectacle lens 10 in the achromatic region 22 at the transition point 40 correspond to one another. No discontinuity therefore takes place in the spherical power or the astigmatic power for a user at the transition point 40.

Following the step 112, the steps 106, 108, 110 and 112 may in principle be repeated for a further cross-sectional plane 47. In this way, the spectacle lens 10 can be configured for a multiplicity of cross-sectional planes 25, 47. For example, a plurality of cross-sectional planes respectively mutually inclined at a particular angle may be provided, so as to configure the spectacle lens fully. In this case, it is not compulsory for the steps 106, 108, 110 and 112 to be carried out successively for each cross section, and the configuration and/or optimization may also be carried out in parallel for all cross-sectional planes.

The configuration method 100 then ends at a stop step 114 along a branch 116.

The design of the spectacle lens 10, or of the first lens element 18 and of the second lens element 24, is now complete. The profiles of the respective front and back surfaces have been ascertained, so that the first lens element 18, the second lens element 24 and therefore the entire spectacle lens 10 can be manufactured. To this extent, a method 122 for producing a spectacle lens 10 comprises the method 100 for designing the spectacle lens 10.

In an optional step 118, the step 112 may be followed by a step 118 of optimizing the configured spectacle lens by means of a ray tracing method. The method 100 then subsequently ends at the step 118 at the stop step 114 along the branch 120.

Following the second determination step 112 or the optimization step 118, the design of the first lens element 18 and of the second lens element 24 is then established. In a step 124, the first lens element may therefore be manufactured.

In a step 126, the second lens element is manufactured. The steps 124 and 126 may of course also be carried out in parallel or arranged in another way. Finally, in a step 128, the manufactured first lens element and the manufactured second lens element are then provided. In the step 128, the first lens element 18 and the second lens element 24 are connected together. In particular, the lens elements 18, 24 may be cemented together or contact-bonded.

The production method 122 then likewise ends at the stop step 114.

In FIGS. 11a to 11f, a comparative example is given for a conventional spectacle lens, which is formed only from a single first lens element 18.

Figure 11A:
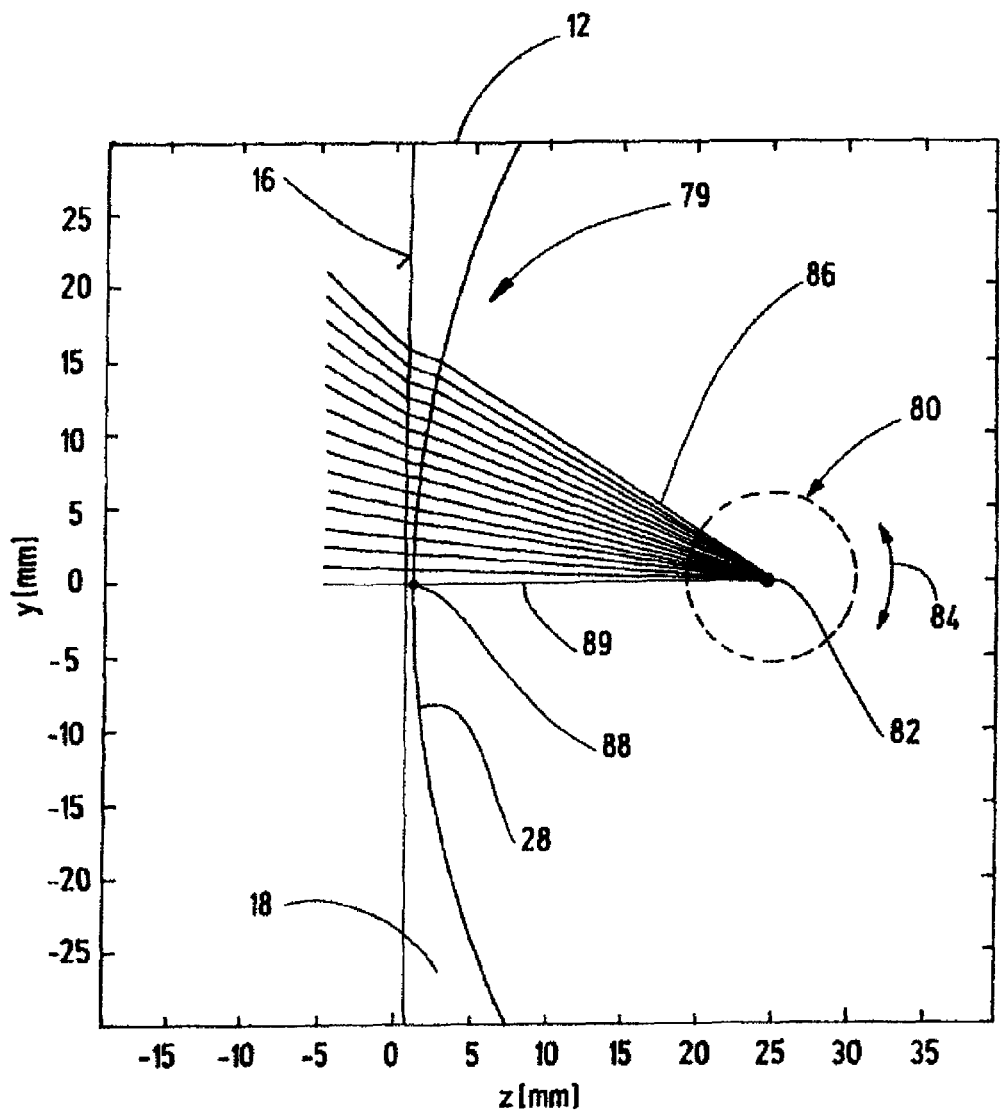
FIGS. 11a to 11f show a comparative example of a spectacle lens formed merely by a first lens element and representations of the profiles of the relevant sizes and effects over the height of the spectacle lens.

FIG. 11a represents a cross section of such a spectacle lens. Such a spectacle lens consisting only of the first lens element 18 may form a basic design 79, on which a search is first made for the transition points 40, in which a pair of transverse aberrations for a user 80, whose eye is schematically indicated by dashed lines as a circle in FIG. 11a, are studied. The user 80 has user data, which inter alia indicate the position of the eye rotation point 82. A study of the profile of a transverse chromatic aberration on the back surface 28 of the first lens element 18 is carried out in the scope of the extent by determination of principal rays 86, coming from the eye rotation point 82, of the eye of the user 80 and the profile through the first lens element 18. The various principal rays 86 then reflect different rotation angles or fixation directions 84 of the user. A relaxed position of the eye of the user 80 has a zero visual line 89 as principal ray 86. The zero visual line 89 intersects the back surface 28 of the first lens element 18 at a zero visual point 88.

For the comparative example represented in FIGS. 11a to 11f, the distance from the eye rotation point 82 to the back surface 28 of the first element 18 along the zero visual line 89 is 24 mm. The front surface 16 of the first lens element 18 is spherical and has a radius of 807 mm. The back surface 28 is likewise spherical and has a radius of 73.364 mm. The first lens element 18 is formed from a material having a refractive index of 1.807 and an Abbe number of 34.4. A principal ray 86, which intersects the back surface 28 at a height Y=8 mm, will then reach a transverse chromatic aberration of 0.25 cm/m predefined as perturbing.

Figure 11B:
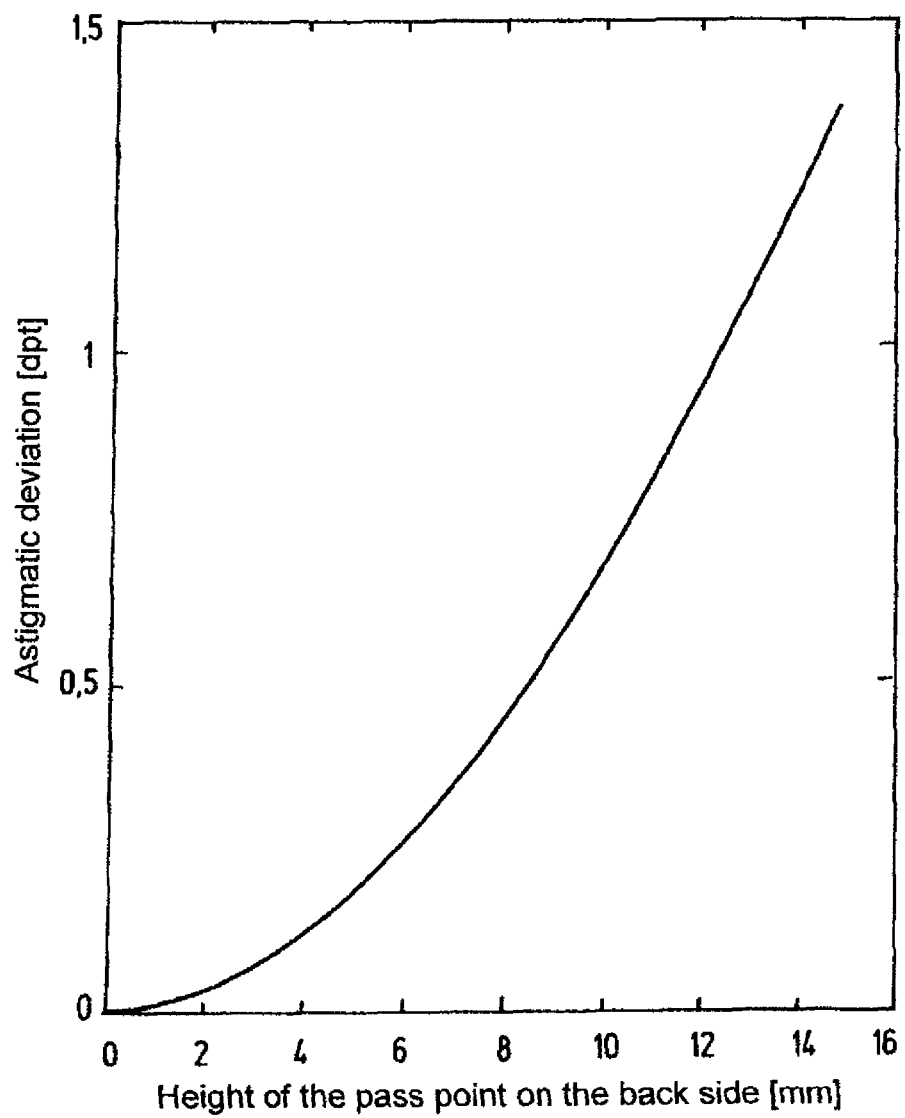
Figure 11C:
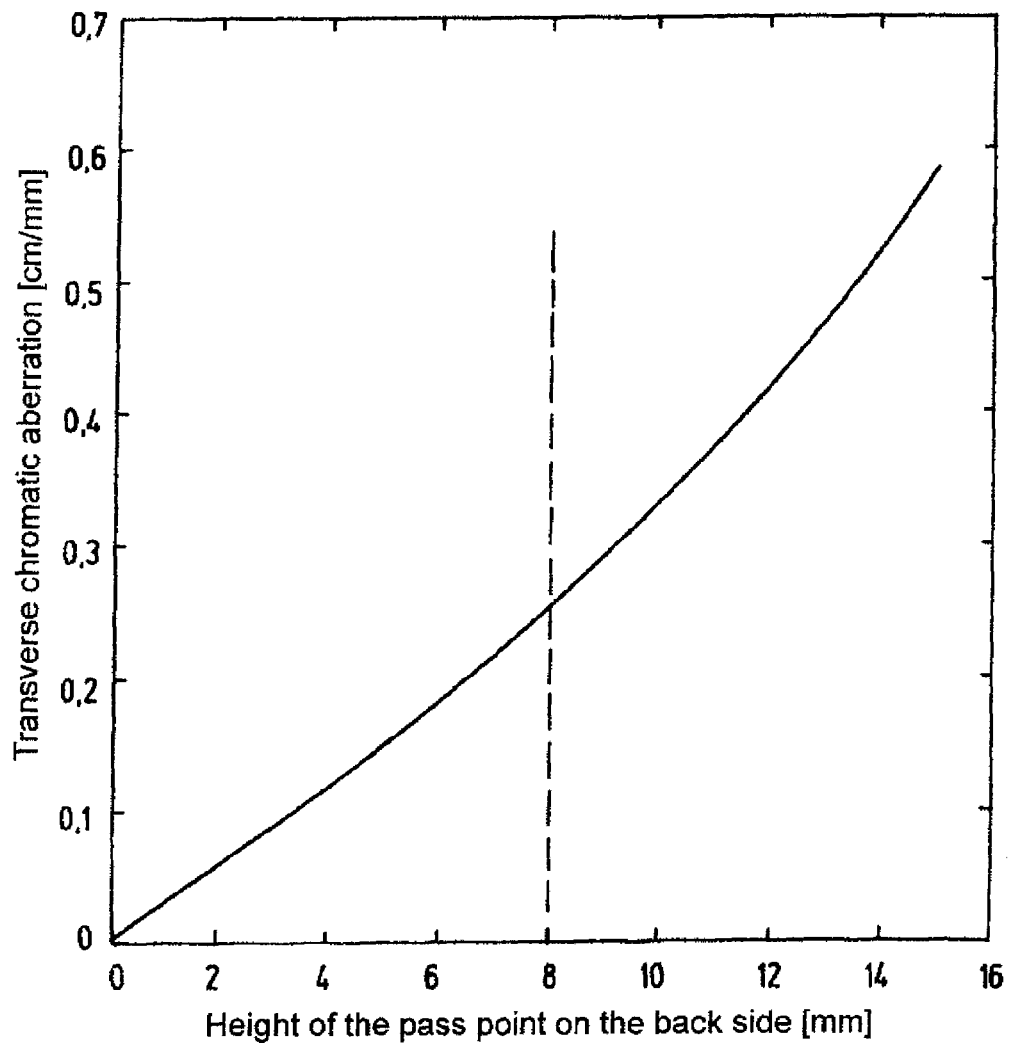

The profile of the astigmatic deviation of the comparative example represented in FIG. 11a is plotted in FIG. 11b. A profile of the transverse chromatic aberration as a function of the height of the pass point of a principal ray 86 coming from the eye rotation point 82 on the back side 28 of the first lens element 18 is plotted in FIG. 11c. As can be seen, for a height of 8 mm on the back side 28, the transverse chromatic aberration is 0.25 cm per m. If this is the transverse chromatic aberration limit value predefined as perturbing and it is established that the transition point 40 lies in the cross-sectional plane where the transverse chromatic aberration for the user 80 corresponds to the transverse chromatic aberration limit value, then a height of 8 mm on the back side 28 is correspondingly marked as the transition point 40. The achromatic region 22 is therefore to be addressed between the transition point 40 and the edge 12 of the spectacle lens, in order to reduce the transverse chromatic aberration.

Figure 11D:
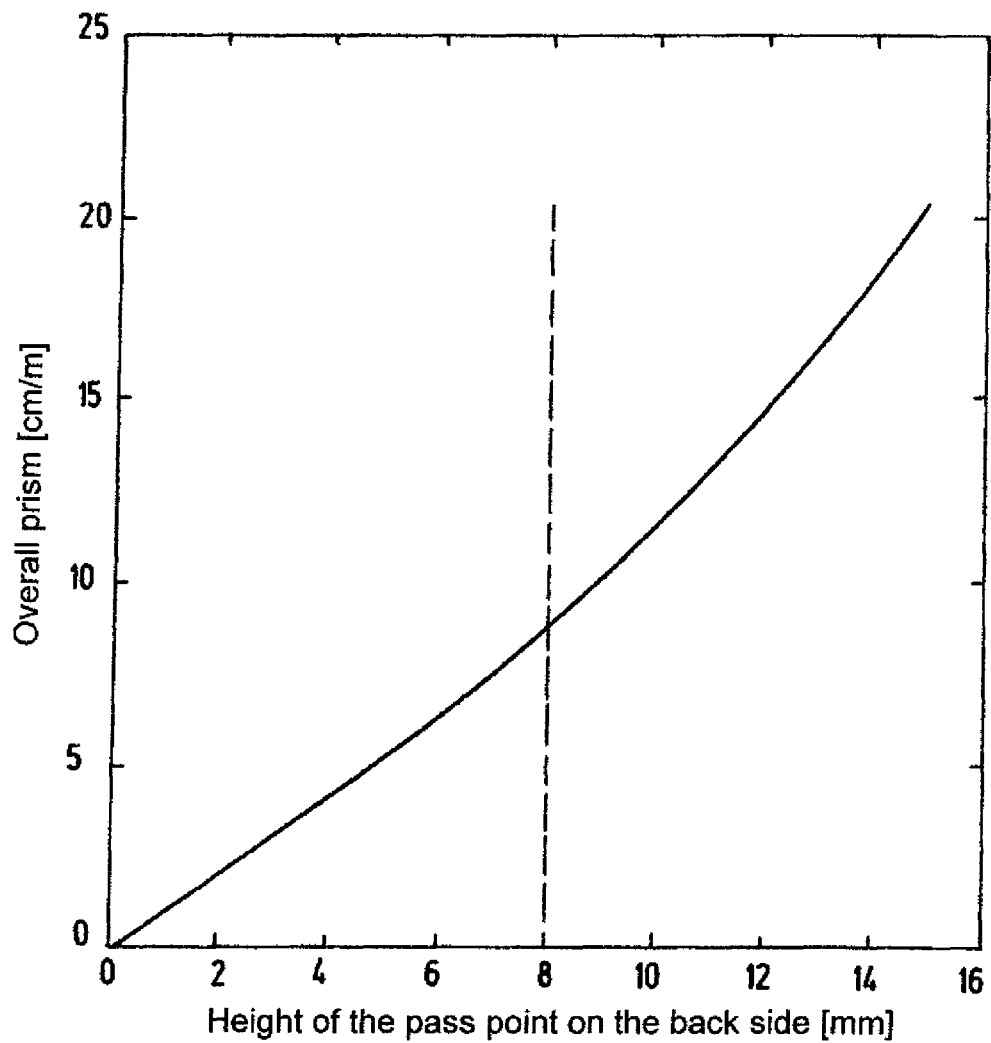

An overall prismatic power in the cross-sectional plane, i.e. the ray deviation occurring overall, is plotted in FIG. 11d as a function of the height of the pass point of the principal ray 86 on the back side 28 of the spectacle lens.

Figure 11E:
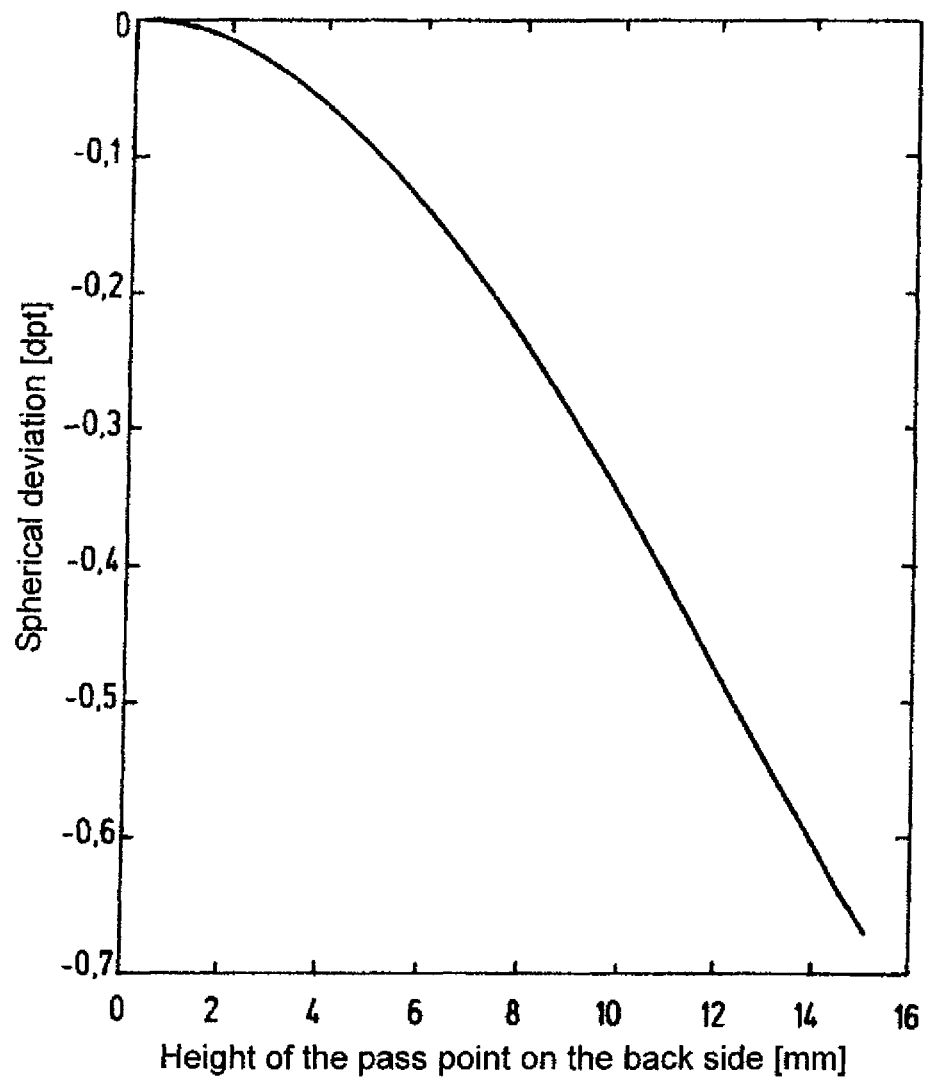
Figure 11F:
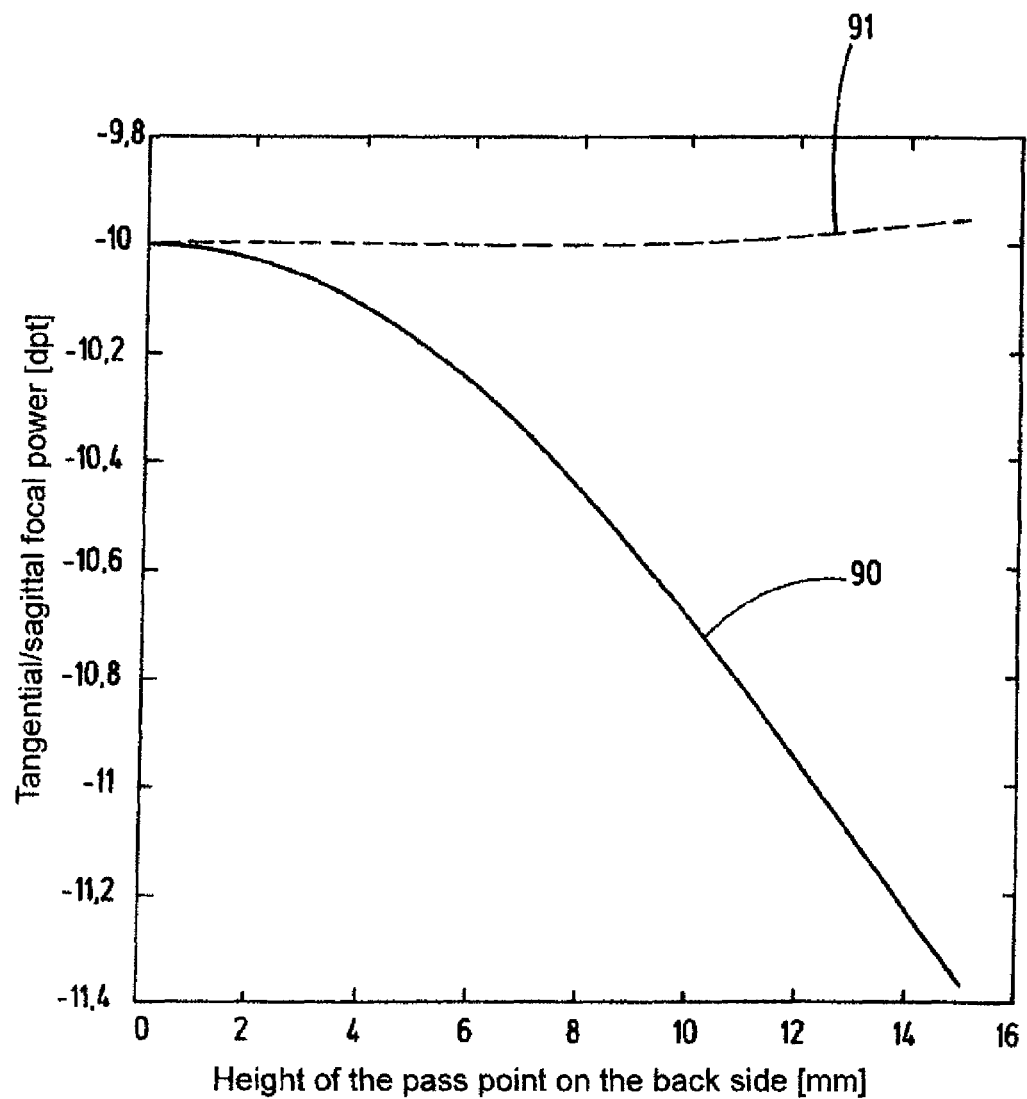

In FIG. 11e, a corresponding profile of the spherical deviation is plotted. In FIG. 11e, a tangential intersection length, i.e. an intersection length in a meridian plane containing the principal ray 86, and a sagittal intersection length, i.e. an intersection length in a plane containing the principal ray 86 perpendicular to the meridian plane, are plotted, again as a function of the height of the pass point of a principal ray 86 on the back side 28 of the spectacle lens 10. The tangential intersection length is represented by the line 90 and the sagittal intersection length is represented by the line 91.

Figure 12A:
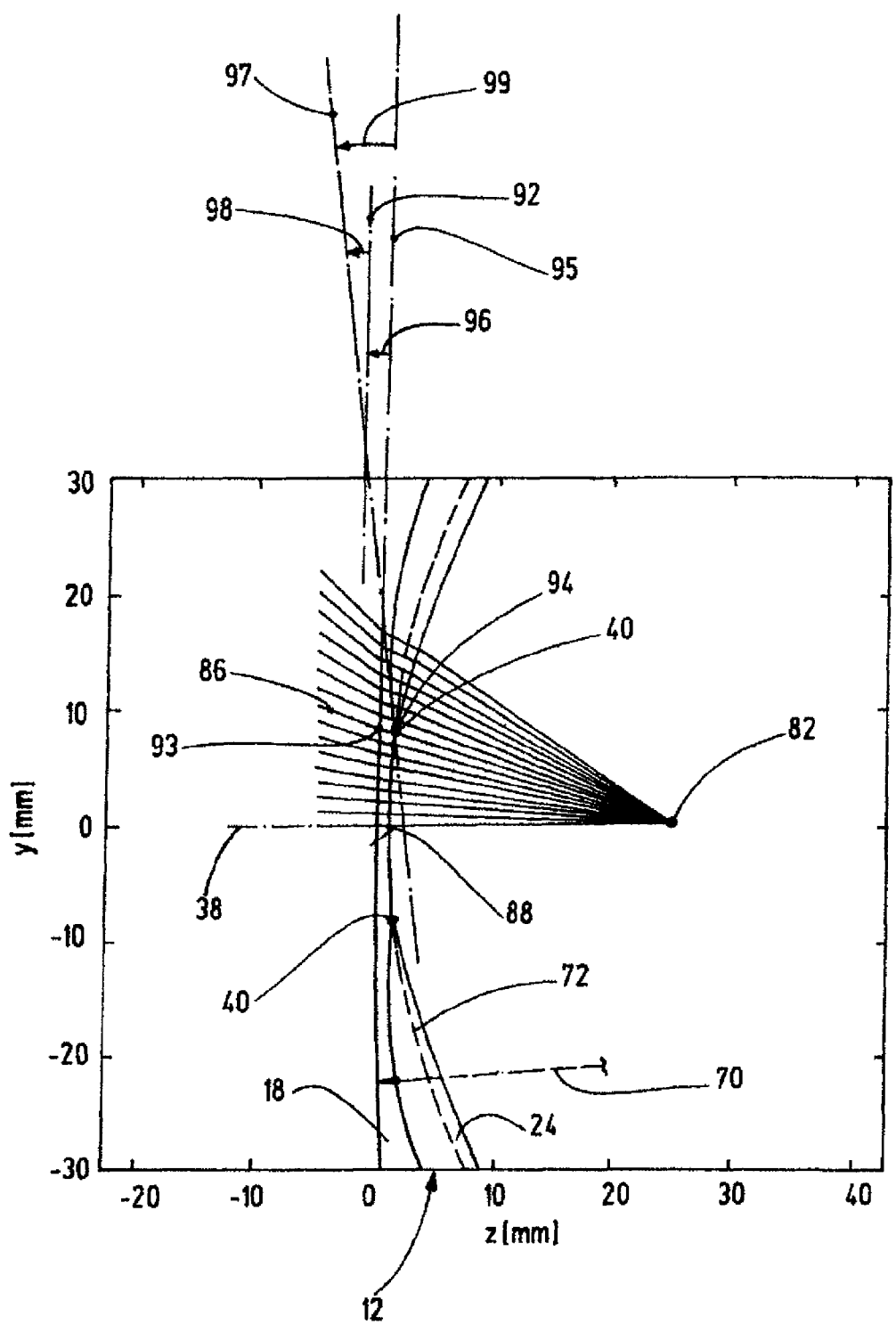
FIGS. 12a to 12f show an exemplary embodiment of a spectacle lens formed according to the invention, in which the front and back surfaces of the second lens element have a constant curvature in the cross-sectional plane, as well as the associated relevant sizes and effects in the profile over the height of the spectacle lens.

A first example of a spectacle lens configured according to the invention is represented in FIG. 12a. This spectacle lens has the following values. The distance of the eye centre 82 from the back surface 26 is 24 mm. The first radius is 807 mm. The second radius is 73.364 mm. The front surface 16 of the first lens element 18 and the first back surface region 30 of the first lens element 18 are formed spherically. A second radius of curvature at the transition point 40 is 45.514 mm. The first radius of curvature at the transition point 40 is 150 mm. The first lens element has a refractive index of 1.807, and the Abbe number of the first lens element 18 is 34.4. The second lens element has a refractive index of 1.525. The Abbe number of the second lens element 24 is 58.3.

The spectacle lens is therefore formed rotationally symmetrically. The position of a transition point 40 lies at a height of the back surface 26 of the spectacle lens 10 of 8 and −8 mm, respectively, starting from the optical axis 38 of the spectacle lens 10. The front surface 34 and the back surface 36 of the second lens element 24 are formed spherically. A respective centre of curvature of the surface, however, lies away from the optical axis 38. Thus, the centre of curvature of the second radius of curvature lies at the coordinates Y=14.1 and Z=46.541. The centre of the first radius of curvature lies at Y=−29.109 and Z=146.775. The kink angle is 8.063°. The wedge edge angle is 22.025°. The origin of the Y-Z coordinate system represented in FIG. 12a in this case lies at the intersection of the optical axis with the front surface 14 of the spectacle lens 10.

FIG. 12a furthermore schematically represents a normal plane 92. This extends perpendicularly to the cross-sectional plane 25, which in the embodiment represented lies in the Y-Z plane. Consequently, the normal plane 92 lies in the X-Y plane. The principal ray 86 starting from the eye rotation point 82, which crosses the back surface 26 of the spectacle lens 10 on or at the transition point 40, crosses the back surface 26 at the pass point 94. Furthermore, it crosses the front surface 14 of the spectacle lens 10 at a pass point 93. The tangent of the front surface 14 of the spectacle lens 10 is denoted by the reference 95. The angle with respect to the normal plane 92 is the angle W1 and is denoted by the reference 96. A tangent of the front surface 34 of the second lens element 24 is denoted by the reference 97. The angle with respect to the normal plane 92 is denoted by the reference 98. Between the tangents 95 and 97 lies the "further wedge angle", which is denoted by the reference 99. The angle 99 therefore reflects the wedge angle for a principal ray 86 extending through the achromatic region 22 at the transition point 40.

Figure 12B:
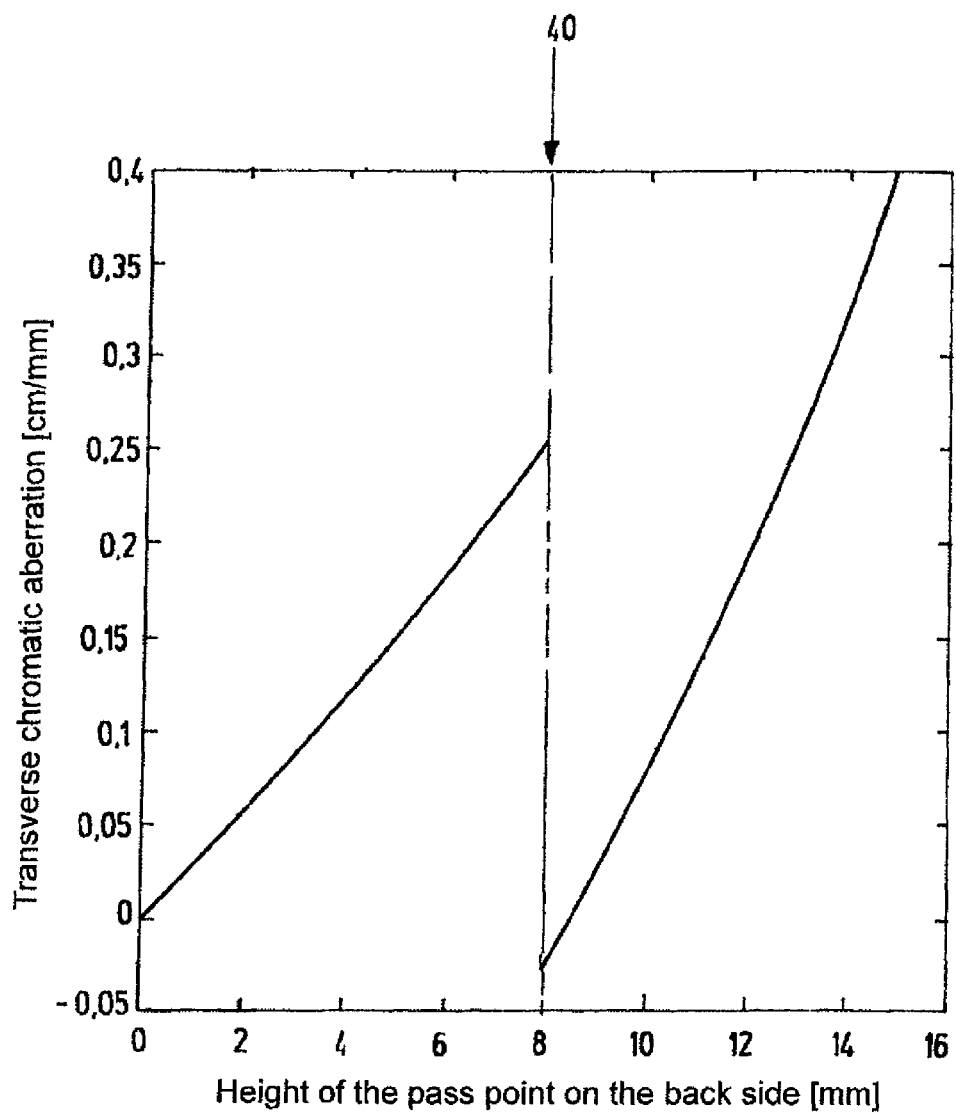

FIG. 12b shows the way in which the profile of the transverse chromatic aberration varies over the height of the spectacle lens owing to the configuration according to the invention. At the transition point 40, a discontinuity takes place. A perturbing transverse chromatic aberration of more than 0.25 cm/m therefore only occurs beyond a height of about 13 mm instead of 8 mm.

Figure 12C:
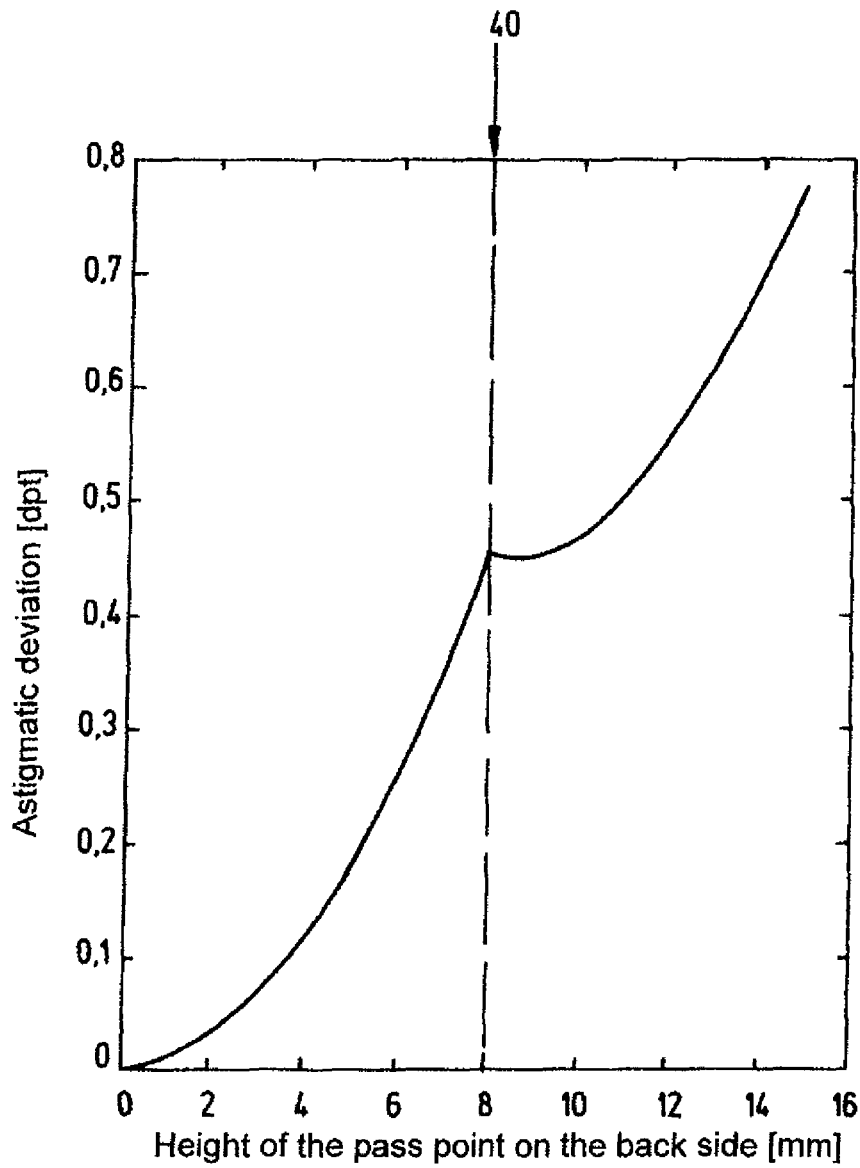
Figure 12D:
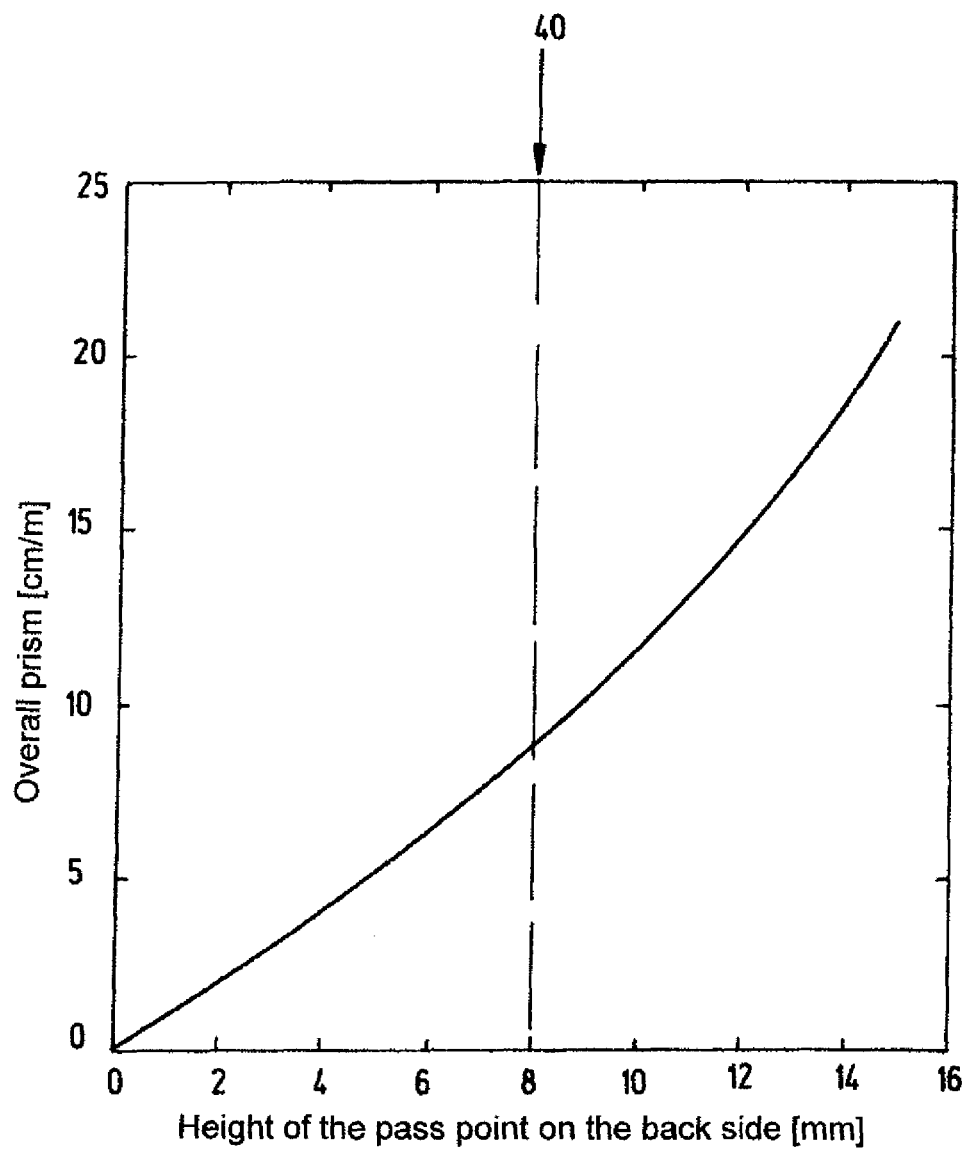
Figure 12E:
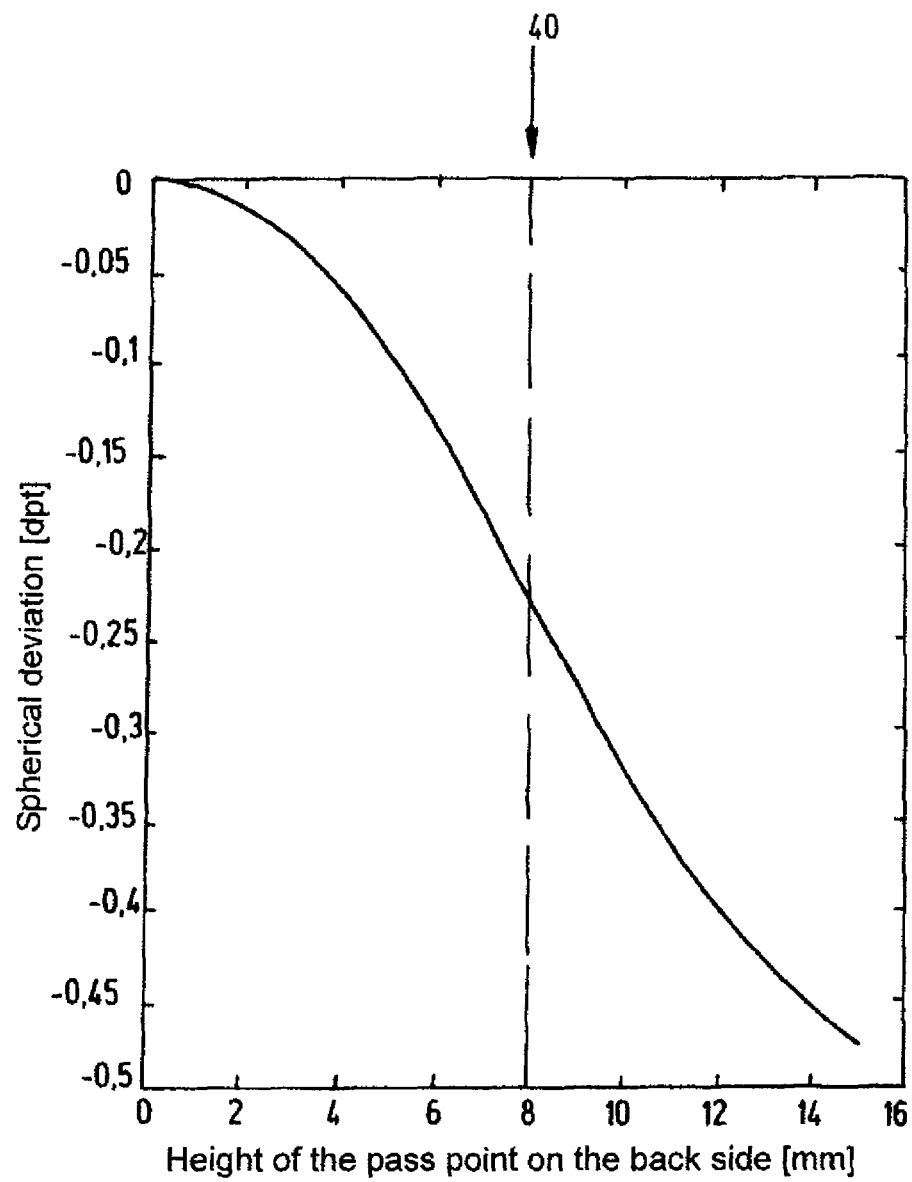

As can be seen in FIGS. 12c, 12d and 12e it is also possible for continuous profiles of the astigmatic deviation, the overall prism and the spherical deviation to be achieved over the height of the spectacle lens. At the transition point 40, the profiles may naturally have a kink, although they do not have a discontinuity there. To this extent, there is no perturbing power discontinuity at each transition point 40.

Figure 12F:
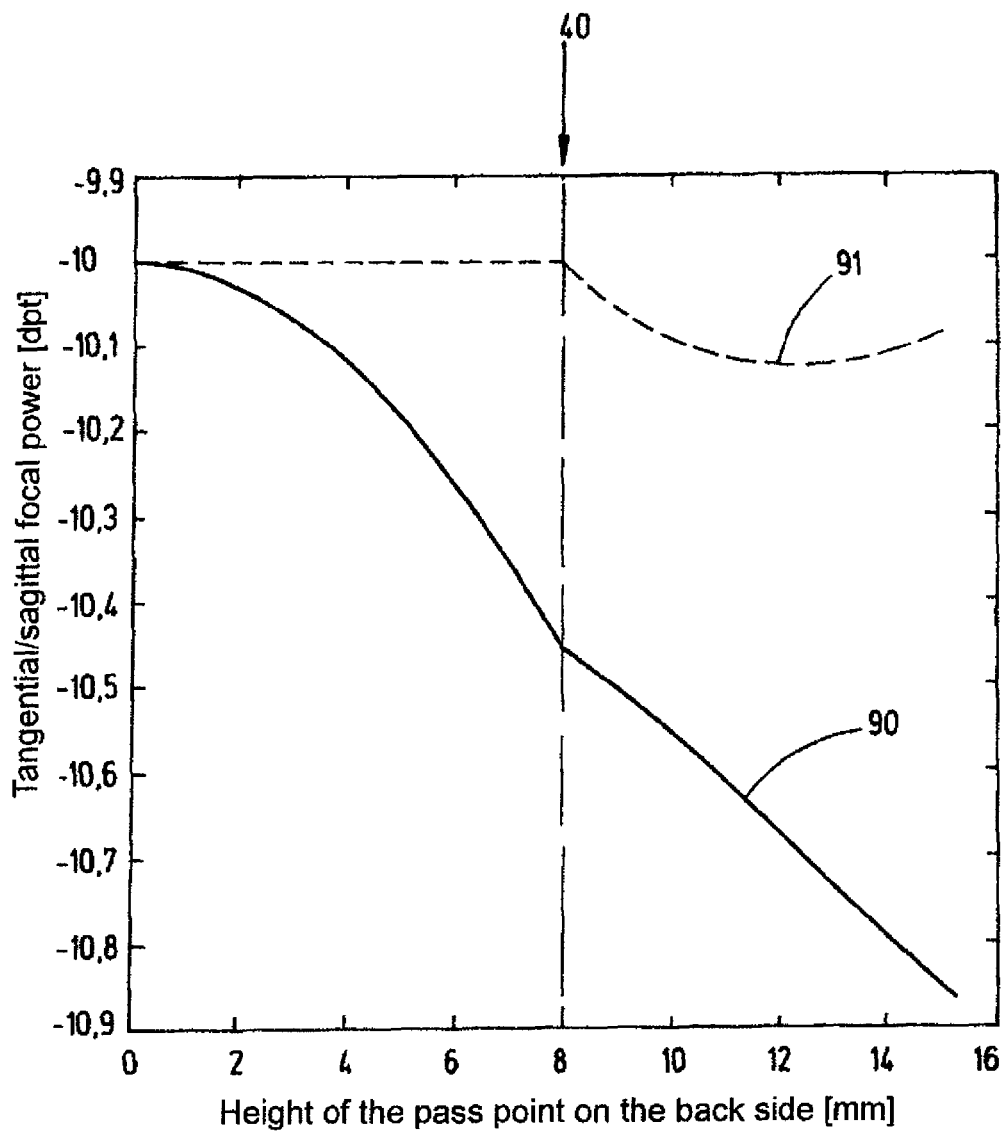

The tangential and sagittal intersection lengths are plotted in FIG. 12f. The tangential intersection length is again denoted by the reference 90. The sagittal intersection length is denoted by the reference 91.

Figure 13A:
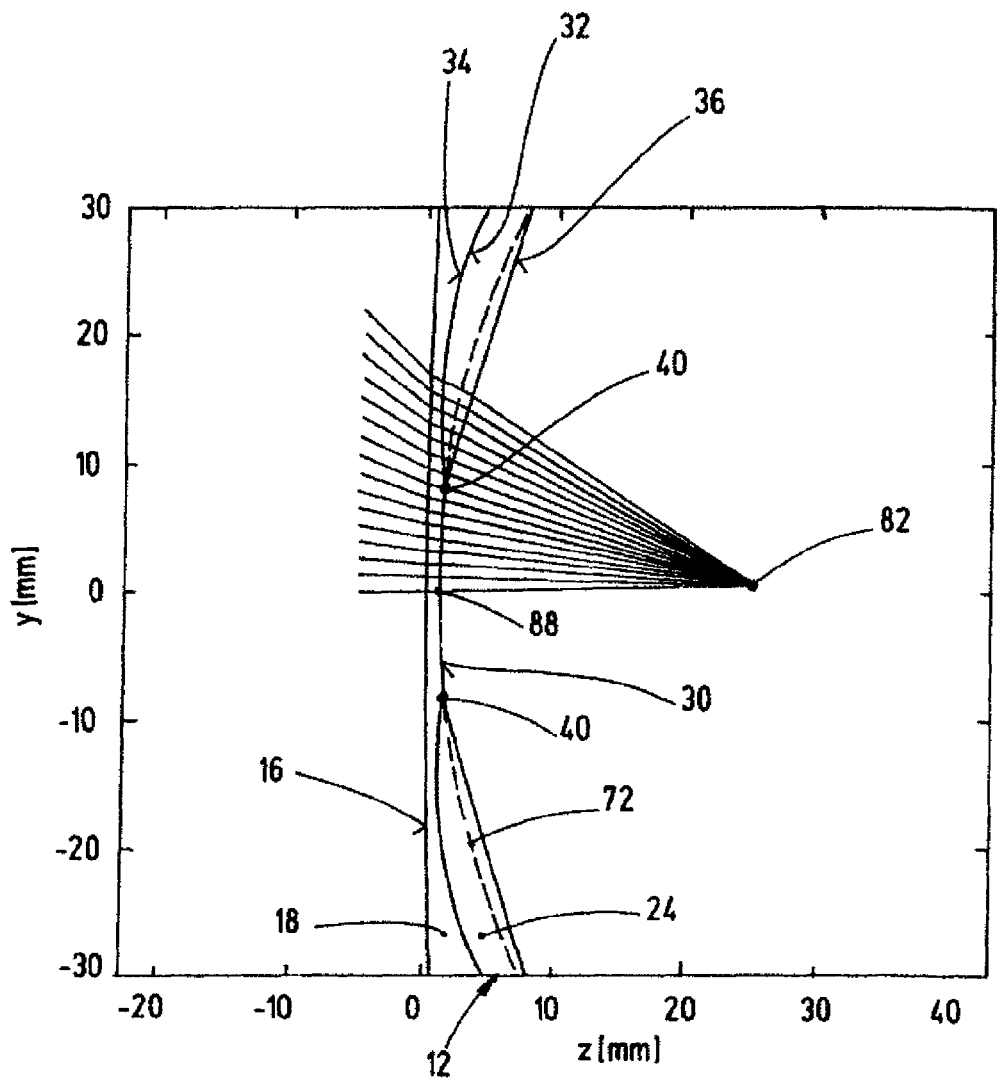
FIGS. 13a to 13f show another embodiment of a spectacle lens according to the invention, the front and back surfaces of the second lens element being formed by means of a third-order polynomial, as well as the associated sizes and effects in their profile over the height of this spectacle lens.

FIG. 13a represents yet another exemplary embodiment of a spectacle lens configured according to the invention, or a spectacle lens according to the invention. Identical elements are denoted by the same references and will not be explained again. In this exemplary embodiment, the front surface 34 of the second lens element 24 and the back surface 36 of the second lens element 24 are formed as third-order polynomials. This provides an additional degree of freedom, by which a thickness of the edge 12 of the spectacle lens in the embodiment represented in FIG. 13a can be reduced in comparison with the embodiment represented in FIG. 12a.

In the exemplary embodiment represented in FIG. 13a, the distance of the eye rotation point from the back surface of the spectacle lens 10 is 24 mm. The first radius of the spherical front surface 16 of the first lens element 18 is 807 mm. The second radius of the spherical first back surface region 30 is 73.364 mm. The second radius of curvature at the transition point 40 is 45.514 mm. The first radius of curvature at the transition point 40 is 150 mm. The first lens element 18 has a refractive index of 1.807 and an Abbe number of 34.4. The second lens element 24 has a refractive index of 1.807 and an Abbe number of 58.3. As in the exemplary embodiment represented in FIG. 12a, the kink angle is 8.063°. The wedge edge angle is likewise 22.025° as in the exemplary embodiment represented in FIG. 12a. The transition points 40 likewise lie at a height of ±8 mm on the back surface 26 of the spectacle lens 10.

Starting from a transition point 40, the polynomial $Z(\Delta Y)$ is formed by $1.43748564 - 0.13523588 \Delta Y + 0.01128837 \Delta Y^2 + 0.00005 \Delta Y^3$. This polynomial forms the front surface 34 of the second lens element 24. For the back surface 36 of the second lens element 24, starting from a transition point 40 the corresponding polynomial for the surfaces of FIG. 13a can therefore be expressed as Z of $\Delta Y = 1.43748564 + 0.25532965 \Delta Y + 0.00366456 \Delta Y^2 - 0.00009 \Delta Y^3$.

Figure 13B:
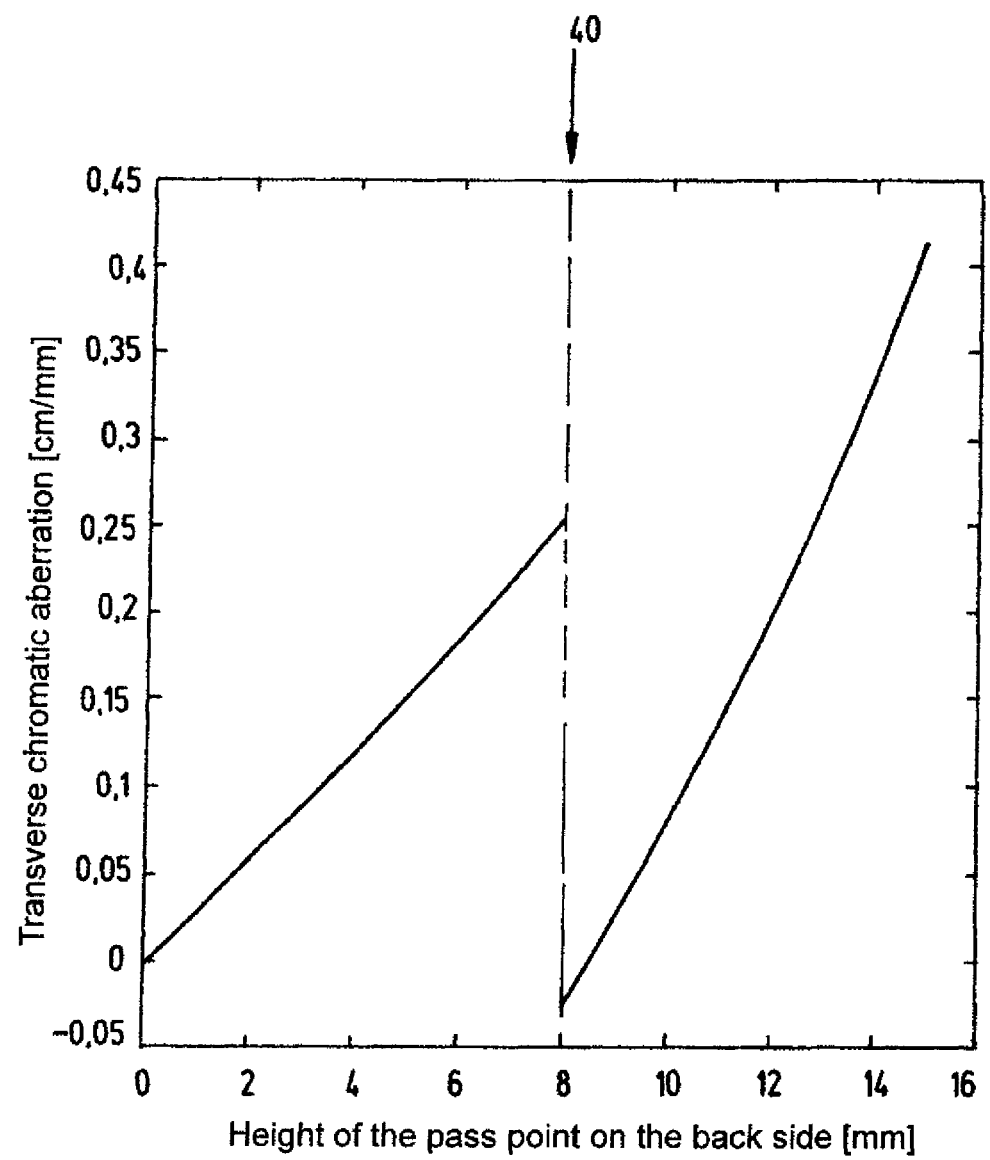

The profile of the transverse chromatic aberration as a function of the height of the pass point of a principal ray on the back side of the spectacle lens 10 is in turn plotted in FIG. 13b; as can be seen, the transverse chromatic aberration can again be reduced very significantly at the transition point, so that overall the height of the spectacle lens beyond which the transverse chromatic aberration is perturbing for a user can be increased.

Figure 13C:
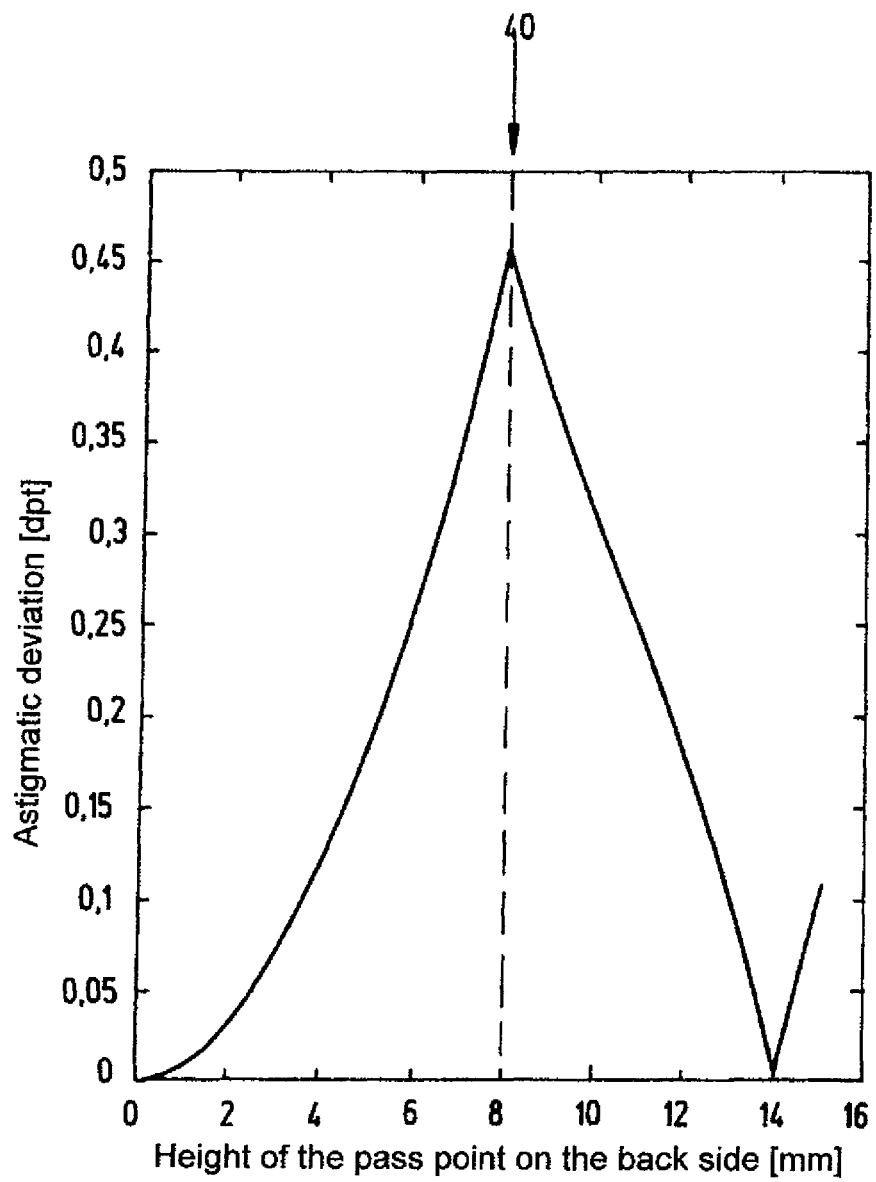
Figure 13D:
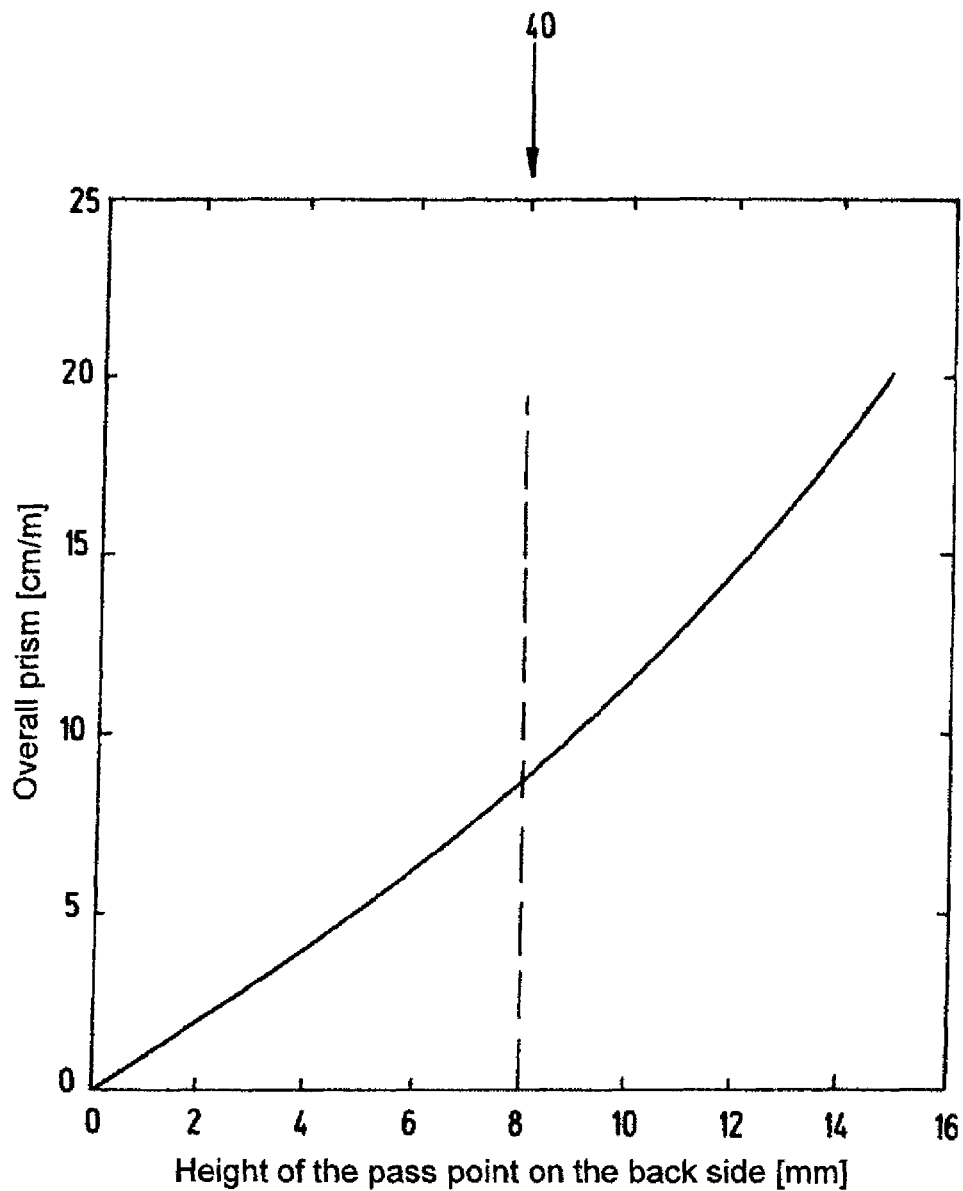
Figure 13E:
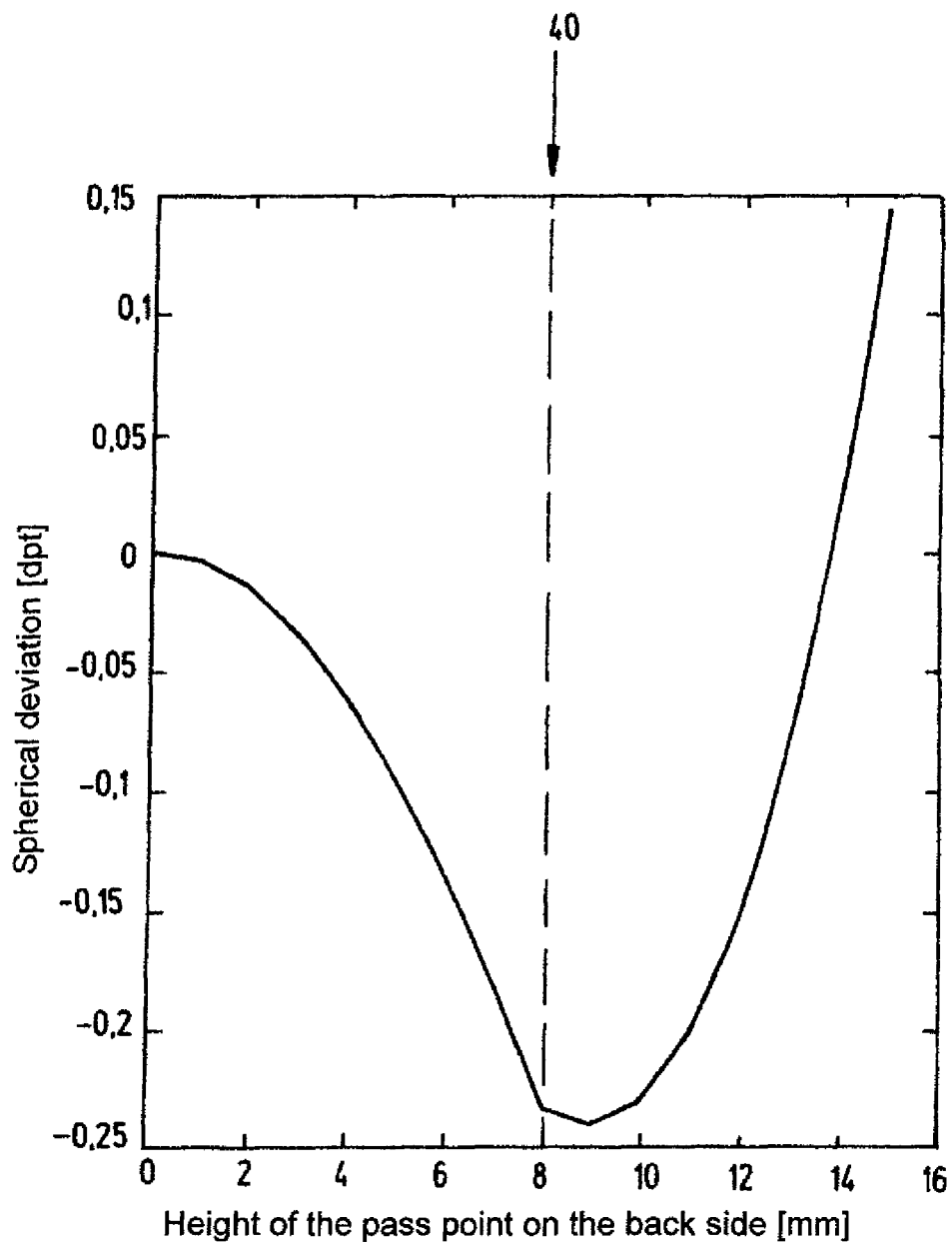

FIGS. 13c, 13d and 13e in turn show that a spherical power, an astigmatic power and a total prismatic power have a continuous profile over the transition point 40. A power discontinuity at the transition point 40 is therefore fully avoided.

Figure 13F:
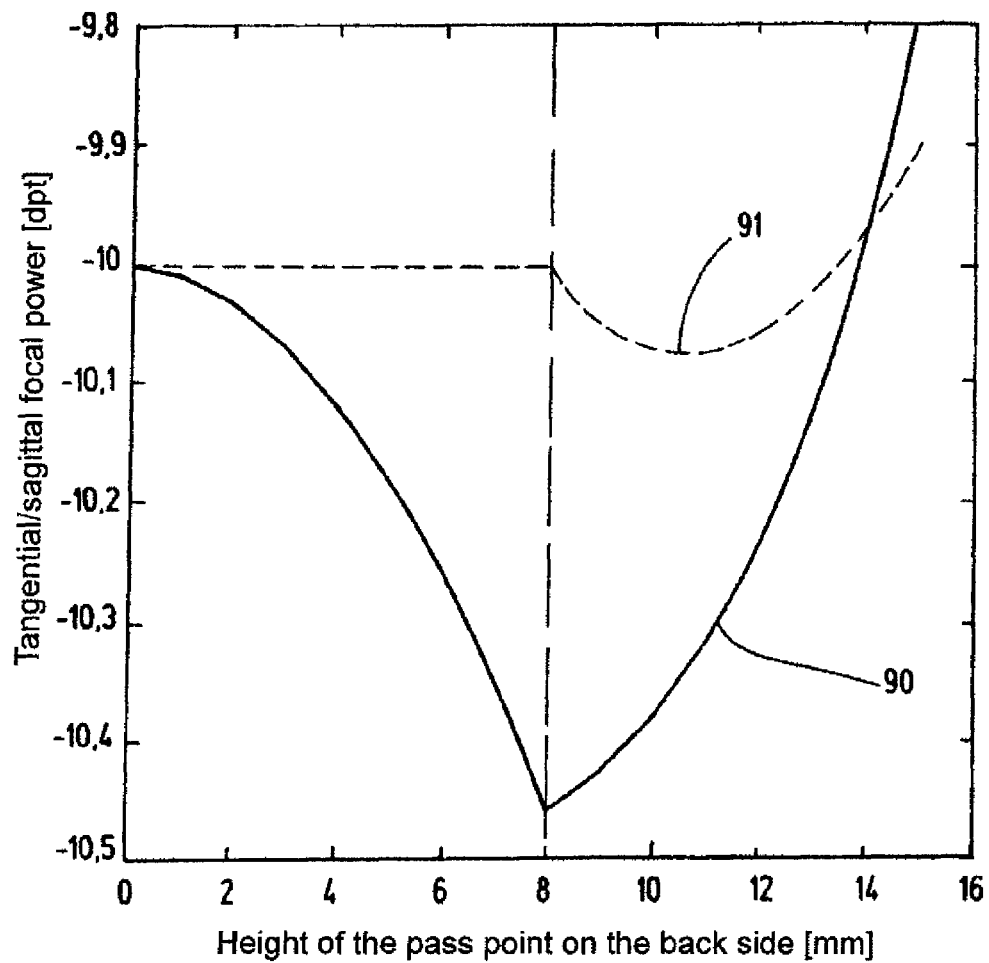

The tangential and sagittal intersection lengths are in turn plotted in FIG. 13f. The tangential intersection length is again denoted by the reference 90. The sagittal intersection length is denoted by the reference 91.

Figure 14A:
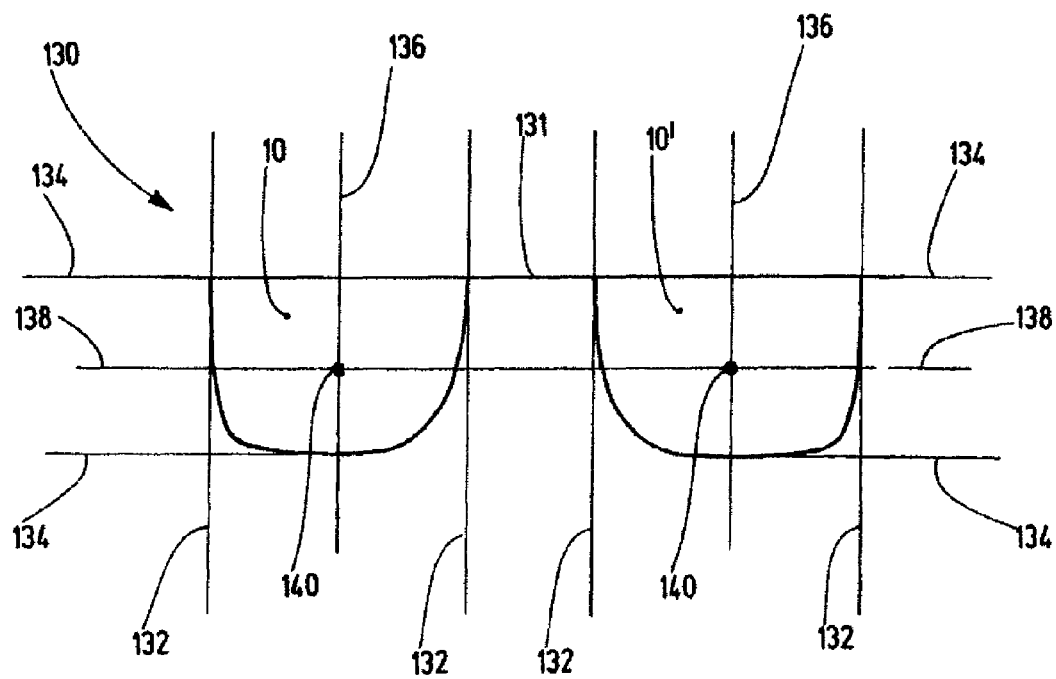
FIGS. 14a and 14b show a front view and a plan view of an embodiment of spectacles having at least one spectacle lens configured according to the invention.
Figure 14B:
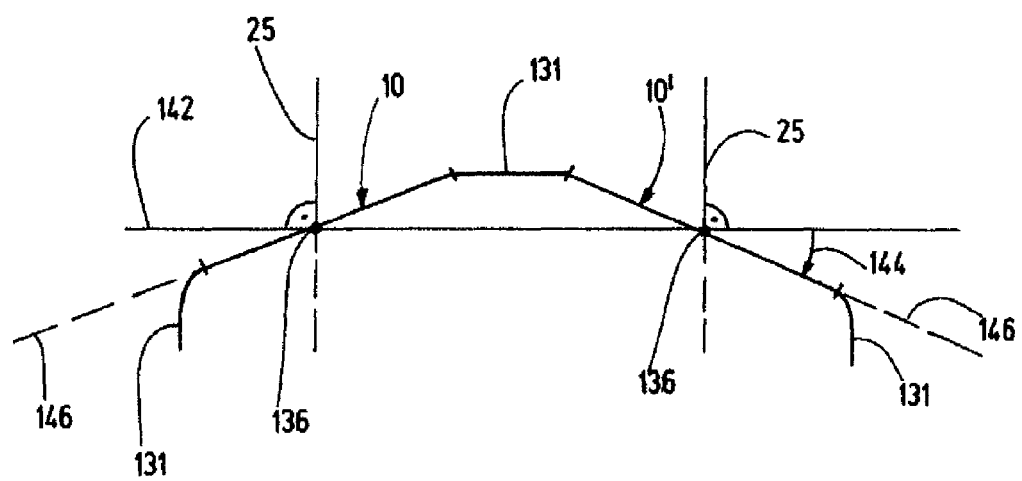

FIGS. 14a and 14b show an embodiment of spectacles 130. The spectacles 130 have a first spectacle lens 10 and a second spectacle lens 10'. The first spectacle lens 10 and/or the second spectacle lens 10' are formed as described above. The spectacle lenses 10, 10' are arranged in a frame 131.

For these spectacles, a box system or box frame is defined in the manner known to the person skilled in the art. The box of each spectacle lens 10, 10' is bounded by vertical tangents 132 and horizontal tangents of the respective spectacle lens 10, 10'. For each spectacle lens 10, 10', a horizontal centreline 138 extends at an equal distance from each of the horizontal tangents 134. In the example represented, these are identical. This, however, need not necessarily be the case.

For each spectacle lens 10, 10', a vertical centreline 136 extends at an equal distance from each of the vertical tangents 132. The plane which contains the two vertical centrelines is a plane of the spectacle plane 142, as illustrated in FIG. 14b. The plane of the spectacle plane 142 may therefore have a face form angle 144 with respect to the planes of the spectacle plane 146, 146' of the spectacle lenses 10, 10'. A cross-sectional plane 25, 47 may then extend as a normal to the plane of the spectacle plane 142 and contains the respective boxed centre 140.

What is claimed is:

1. A method for designing a spectacle lens for a user, the spectacle lens comprising a first lens element and at least one second lens element, the first lens element having a front surface and a back surface that comprises a first back surface region and a second back surface region, the at least one second lens element comprising a front surface and a back surface, the second back surface region of the first lens element and the front surface of the second lens element being contiguous, a front surface of the spectacle lens being formed by the front surface of the first lens element and a back surface of the spectacle lens being formed in a base region by the first back surface region of the first lens element and in an achromatic region by the back surface of the at least one second lens element, comprising the following steps:

first establishing a first material of the first lens element and a second material of the at least one second lens element;

ascertaining at least one first transition point between the base region and the achromatic region on the back surface of the spectacle lens, a first cross-sectional plane of the spectacle lens extending through the at least one first transition point;

first determining a wedge edge angle between the back surface of the at least one second lens element and the front surface of the at least one second lens element at the at least one first transition point in the first cross-sectional plane and determining a kink angle between a tangent of the first back surface region in the first cross-sectional plane at the at least one first transition point and a tangent of the back surface of the at least one second lens element in the first cross-sectional plane at the at least one first transition point, in such a way that a prismatic power of the spectacle lens in the base region at the at least one first transition point corresponds for the user to a prismatic power of the spectacle lens in the achromatic region at the at least one first transition point;

second establishing a first radius of curvature of the back surface of the at least one second lens element in the first cross-sectional plane at the transition point; and, second determining a second radius of curvature of the front surface of the at least one second lens element of the at least one second back surface region of the first lens element in the first cross-sectional plane at the transition point, in such a way that a spherical power and an astigmatic power of the spectacle lens in the base region at the transition point correspond for a user of the spectacle lens to a spherical power and an astigmatic power of the spectacle lens in the achromatic region at the transition point.

2. The method according to claim 1, wherein the front surface of the first lens element is spherical and the first establishment step comprises establishment of a third radius of the front surface of the first lens element.

3. The method according to claim 1, wherein the first back surface region of the first lens element is spherical in the base region, and the first establishment step comprises establishment of a fourth radius of the first back surface region.

4. The method according to claim 1, wherein in the step of the first determination of the kink angle, the kink angle is determined as a function of the first material, the at least one second material, a predetermined variation of the transverse chromatic aberration for the user of the spectacle lens at the transition point, the prismatic power of the first lens element in the first cross-sectional plane in the base region at the transition point, an inclination angle of the front surface of the first lens element relative to a normal plane of the first cross-sectional plane at a pass point through the front surface of the first lens element of a principal ray coming from an eye rotation point of the user through the at least one first transition point, and an inclination angle of the first back surface region relative to the normal plane at the at least one first transition point.

5. The method according to claim 1, wherein at least the steps of the first determination of the wedge edge angle and the kink angle and of the at least one second determination of the second radius of curvature are carried out in a multiplicity of different cross-sectional planes, and for at least one transition point in each cross-sectional plane of the multiplicity of cross-sectional planes.

6. The method according to claim 1, wherein the spectacle lens is rotationally symmetrical with respect to an optical axis of the spectacle lens, and the steps of the first determination of the wedge edge angle and the kink angle and of the determination of the second radius of curvature are carried out in only one cross-sectional plane.

7. The method according to claim 1, wherein the first cross-sectional plane is a meridian plane of the spectacle lens.

8. The method according to claim 1, wherein the cross-sectional plane comprises the respective at least one first transition point, an eye rotation point of the user and a zero visual point on the back surface of the spectacle lens.

9. The method according to claim 1, wherein the front surface of the at least one second lens element and/or the back surface of the at least one second lens element have a constant curvature in the first cross-sectional plane.

10. The method according to claim 1, wherein a centre of curvature of the front surface of the at least one second lens element and/or of the back surface of the at least one second lens element in the first cross-sectional plane lies outside a symmetry axis of the front surface of the at least one second lens element or respectively of the back surface of the at least one second lens element.

11. The method according to claim 1, wherein the front surface of the at least one second lens element and/or the back surface of the at least one second lens element is aspherical.

12. The method according to claim 1, wherein the ascertainment of the at least one transition point is carried out on the basis of a predetermined transverse chromatic aberration limit value of a transverse chromatic aberration for the user, the transverse chromatic aberration for the user at the at least one first transition point being less than or equal to the transverse chromatic aberration limit value.

13. The method according to claim 1, wherein the at least one first transition point is established by ascertaining a distribution of a transverse chromatic aberration for the user on the back surface of the first lens element, and the at least one first transition point is set at a point on the back surface of the first lens element at which the transverse chromatic aberration is less than or equal to a predetermined transverse chromatic aberration limit value.

14. A method for designing and making a spectacle lens for a user, the spectacle lens including a first lens element and at least one second lens element, the first lens element having a front surface and a back surface that comprises a first back surface region and a second back surface region, the at least one second lens element comprising a front surface and a back surface, the second back surface region of the first lens element and the front surface of the second lens element being contiguous, a front surface of the spectacle lens being formed by the front surface of the first lens element and a back surface of the spectacle lens being formed in a base region by the first back surface region of the first lens element and in an achromatic region by the back surface of the at least one second lens element, the method comprising the steps of:

first establishing a first material of the first lens element and a second material of the at least one second lens element;

ascertaining at least one first transition point between the base region and the achromatic region on the back surface of the spectacle lens, a first cross-sectional plane of the spectacle lens extending through the at least one first transition point;

first determining a wedge edge angle between the back surface of the at least one second lens element and the front surface of the at least one second lens element at the at least one first transition point in the first cross-sectional plane and determining a kink angle between a tangent of the first back surface region in the first cross-sectional plane at the at least one first transition point and a tangent of the back surface of the at least one second lens element in the first cross-sectional plane at the at least one first transition point, in such a way that a prismatic power of the spectacle lens in the base region at the at least one first transition point corresponds for the user to a prismatic power of the spectacle lens in the achromatic region at the at least one first transition point;

second establishing a first radius of curvature of the back surface of the at least one second lens element in the first cross-sectional plane at the transition point;

second determining a second radius of curvature of the front surface of the at least one second lens element of the at least one second back surface region of the first lens element in the first cross-sectional plane at the transition point, in such a way that a spherical power and an astigmatic power of the spectacle lens in the base region at the transition point correspond for a user of the spectacle lens to a spherical power and an astigmatic power of the spectacle lens in the achromatic region at the transition point;
manufacturing the first lens element;
manufacturing the at least one second lens element; and,
connecting the first lens element and the at least one second lens element.

15. A computer program product having program code which is configured to carry out a method for designing a spectacle lens for a user when the computer program product is run on a data-processing device, the spectacle lens including a first lens element and at least one second lens element, the first lens element having a front surface and a back surface that comprises a first back surface region and a second back surface region, the at least one second lens element comprising a front surface and a back surface, the second back surface region of the first lens element and the front surface of the second lens element being contiguous, a front surface of the spectacle lens being formed by the front surface of the first lens element and a back surface of the spectacle lens being formed in a base region by the first back surface region of the first lens element and in an achromatic region by the back surface of the at least one second lens element, the computer program product comprising performing said method by carrying out the following steps:
first establishing a first material of the first lens element and a second material of the at least one second lens element;
ascertaining at least one first transition point between the base region and the achromatic region on the back surface of the spectacle lens, a first cross-sectional plane of the spectacle lens extending through the at least one first transition point;
first determining a wedge edge angle between the back surface of the at least one second lens element and the front surface of the at least one second lens element at the at least one first transition point in the first cross-sectional plane and determining a kink angle between a tangent of the first back surface region in the first cross-sectional plane at the at least one first transition point and a tangent of the back surface of the at least one second lens element in the first cross-sectional plane at the at least one first transition point, in such a way that a prismatic power of the spectacle lens in the base region at the at least one first transition point corresponds for the user to a prismatic power of the spectacle lens in the achromatic region at the at least one first transition point;
second establishing a first radius of curvature of the back surface of the at least one second lens element in the first cross-sectional plane at the transition point; and,
second determining a second radius of curvature of the front surface of the at least one second lens element of the at least one second back surface region of the first lens element in the first cross-sectional plane at the transition point, in such a way that a spherical power and an astigmatic power of the spectacle lens in the base region at the transition point correspond for a user of the spectacle lens to a spherical power and an astigmatic power of the spectacle lens in the achromatic region at the transition point.

16. A spectacle lens comprising a first lens element and a second lens element, the first lens element being formed from a first material and the second lens element being formed from a second material, the first material and the second material interacting at least partially achromatically, the first lens element having a front surface and a back surface that comprises a first back surface region and a second back surface region, the at least one second lens element comprising a front surface and a back surface, the second back surface region of the first lens element and the front surface of the second lens element being contiguous, a front surface of the spectacle lens being formed only by the front surface of the first lens element and a back surface of the spectacle lens being formed in a base region by the first back surface region of the first lens element and in an achromatic region by the back surface of the at least one second lens element, the first back surface region of the first lens element having a first tangent at at least one first transition point between the base region and the achromatic region in a first cross-sectional plane of the spectacle lens, the back surface of the at least one second element having a second tangent at the at least one first transition point in the first cross-sectional plane, wherein the first tangent and the second tangent intersect one another at a kink angle in the first cross-sectional plane, the magnitude of the kink angle being less than 90°.

17. A spectacle lens comprising a first lens element and a second lens element, the first lens element being formed from a first material and the second lens element being formed from a second material, the first material and the second material interacting at least partially achromatically, the first lens element having a front surface and a back surface that comprises a first back surface region and a second back surface region, the at least one second lens element comprising a front surface and a back surface, the second back surface region of the first lens element and the front surface of the second lens element being contiguous, a front surface of the spectacle lens being formed by the front surface of the first lens element and a back surface of the spectacle lens being formed in a base region by the first back surface region of the first lens element and in an achromatic region by the back surface of the at least one second lens element, the first back surface region of the first lens element having a first tangent at at least one first transition point between the base region and the achromatic region in a first cross-sectional plane of the spectacle lens, the back surface of the at least one second element having a second tangent at the at least one first transition point in the first cross-sectional plane, wherein the first tangent and the second tangent intersect one another at a kink angle in the first cross-sectional plane, the magnitude of the kink angle being less than 90°;
wherein the spectacle lens has two transition points in the first cross-sectional plane, the respective first tangent of the first back surface region and the respective second tangent of the back surface of the at least one second lens element intersecting one another at each of the two transition points.

18. The spectacle lens according to claim 16, wherein the first tangent and the second tangent intersect one another at the at least one first transition point in an axial position range of more than 160°.

19. The spectacle lens according to claim 16, wherein the respective first tangent and the respective second tangent intersect one another in each cross-sectional plane of the spectacle lens.

20. The spectacle lens according to claim 16, wherein the first lens element is arranged in the base region and in the achromatic region, a front surface of the spectacle lens being formed by a front surface of the first lens element, a second back surface region of the first lens element and a front surface of the at least one second lens element being contiguous in the achromatic region, and the front surface and the back surface of the at least one second lens element converging on the at least one first transition point in the at least one first cross-sectional plane and forming a wedge edge angle between them.

21. The spectacle lens according to claim 16, wherein the front surface of the at least one second lens element and/or the back surface of the at least one second lens element have a constant curvature in the first cross-sectional plane.

22. The spectacle lens according to claim 21, wherein a centre of curvature of the front surface of the at least one second lens element in the at least one first cross-sectional plane lies outside a symmetry axis of the front surface of the at least one second lens element and/or a centre of curvature of the back surface of the at least one second lens element in the at least one first cross-sectional plane lies outside a symmetry axis of the back surface of the at least one second lens element.

23. The spectacle lens according to claim 16, wherein the front surface of the at least one second lens element and/or the back surface of the at least one second lens element is aspherical.

24. The spectacle lens according to claim 16, wherein the spectacle lens is rotationally symmetrical with respect to an optical axis, the first cross-sectional plane or each cross-sectional plane being a meridian plane of the spectacle lens.

25. The spectacle lens according to claim 16, wherein the first cross-sectional plane or each cross-sectional plane extends through the spectacle lens in such a way that it divides the spectacle lens in a normal plane perpendicular thereto into two equally large areas.

26. A spectacle lens comprising a first lens element and a second lens element, the first lens element being formed from a first material and the second lens element being formed from a second material, the first material and the second material interacting at least partially achromatically, the first lens element having a front surface and a back surface that comprises a first back surface region and a second back surface region, the at least one second lens element comprising a front surface and a back surface, the second back surface region of the first lens element and the front surface of the second lens element being contiguous, a front surface of the spectacle lens being formed only by the front surface of the first lens element and a back surface of the spectacle lens being formed in a base region by the first back surface region of the first lens element and in an achromatic region by the back surface of the at least one second lens element, the first back surface region of the first lens element having a first tangent at at least one first transition point between the base region and the achromatic region in a first cross-sectional plane of the spectacle lens, the back surface of the at least one second element having a second tangent at the at least one first transition point in the first cross-sectional plane, wherein the first tangent and the second tangent intersect one another at a kink angle in the first cross-sectional plane, the magnitude of the kink angle being less than 90°;
wherein the achromatic region extends in the first cross-sectional plane from the at least one first transition point to an edge of the spectacle lens.

27. A spectacles comprising:
a frame;
a first and a second spectacle lens;
the first and/or the second spectacle lens being a spectacle lens including: a first lens element and a second lens element, the first lens element being formed from a first material and the second lens element being formed from a second material, the first material and the second material interacting at least partially achromatically, the first lens element having a front surface and a back surface that comprises a first back surface region and a second back surface region, the at least one second lens element comprising a front surface and a back surface, the second back surface region of the first lens element and the front surface of the second lens element being contiguous, a front surface of the spectacle lens being formed only by the front surface of the first lens element and a back surface of the spectacle lens being formed in a base region by the first back surface region of the first lens element and in an achromatic region by the back surface of the at least one second lens element, the first back surface region of the first lens element having a first tangent at at least one first transition point between the base region and the achromatic region in a first cross-sectional plane of the spectacle lens, the back surface of the at least one second element having a second tangent at the at least one first transition point in the first cross-sectional plane, wherein the first tangent and the second tangent intersect one another at a kink angle in the first cross-sectional plane, the magnitude of the kink angle being less than 90°;
the cross-sectional plane or each cross-sectional plane of the respective spectacle lens containing a boxed centre of the respective spectacle lens and extending as a normal to a plane of the spectacle plane of the spectacles; and,
the plane of the spectacle plane containing the vertical centerlines of the box of the first and second spectacle lenses.

* * * * *